United States Patent
Wu et al.

(10) Patent No.: US 11,734,781 B2
(45) Date of Patent: Aug. 22, 2023

(54) SINGLE-TIER BLOCKCHAIN-BASED SYSTEM AND METHOD FOR DOCUMENT TRANSFORMATION AND ACCOUNTABILITY

(71) Applicant: SIDE, INC., San Francisco, CA (US)

(72) Inventors: Edward Wu, San Mateo, CA (US); Guy Gal, San Francisco, CA (US); Christopher Dzoba, San Francisco, CA (US); Jeffrey Judkins, Richmond, CA (US); Mark J. Stefik, Portola Valley, CA (US); Adriano Castro, San Francisco, CA (US)

(73) Assignee: Side, Inc., San Francisco, CA (US)

( * ) Notice: Subject to any disclaimer, the term of this patent is extended or adjusted under 35 U.S.C. 154(b) by 0 days.

(21) Appl. No.: 17/728,755

(22) Filed: Apr. 25, 2022

(65) Prior Publication Data

US 2022/0253959 A1    Aug. 11, 2022

Related U.S. Application Data

(63) Continuation of application No. 16/560,988, filed on Sep. 4, 2019, now Pat. No. 11,314,699.

(Continued)

(51) Int. Cl.
*G06Q 50/16* (2012.01)
*H04L 9/06* (2006.01)
(Continued)

(52) U.S. Cl.
CPC ......... *G06Q 50/167* (2013.01); *G06F 16/137* (2019.01); *G06F 16/1834* (2019.01);
(Continued)

(58) Field of Classification Search
CPC .. G06F 16/1837; G06F 16/137; G06F 16/248; G06Q 50/167
See application file for complete search history.

(56) References Cited

U.S. PATENT DOCUMENTS 5,848,426 A    12/1998   Wang et al.
6,240,429 B1    5/2001   Thornton et al.
(Continued)

FOREIGN PATENT DOCUMENTS

AU    2004237874    7/2005
CA      2306579    10/2001
WO    2006020801    2/2006

OTHER PUBLICATIONS

Matthew Murphy. "Three Ways Blockchain Could Transform Real Estate in 2018," Jan. 12, 2018, https://www.forbes.com/sites/forbesrealestatecouncil/2018/01/12/three-ways-blockchain-could-transform-real-estate-in-2018/#2ef0cd403638.
(Continued)

*Primary Examiner* — Tarek Chbouki
(74) *Attorney, Agent, or Firm* — Krista A. Wittman

(57) ABSTRACT

A single-tier blockchain-based system and method for document transformation and accountability is provided. Transaction documents including document templates relating to a transfer of real property are maintained. Each template includes form elements. The form elements are each associated with a data field identifier and a data value. A data model is maintained for the transaction documents and includes the data field identifiers and the data values for the form elements. A request is received for the transaction documents. The form elements of the transaction documents are automatically populated with the data values via the data model in response to the request. Compliance checking is performed on the data values populating the form elements. A cryptographic hash of the transaction documents is com- (Continued)

mitted to a blockchain copy stored by one or more network nodes in a single-tier when no errors are identified in the data values during the compliance checking.

20 Claims, 23 Drawing Sheets

Related U.S. Application Data

(60) Provisional application No. 62/728,051, filed on Sep. 6, 2018.

(51) Int. Cl.

| | | |
|---|---|---|
| *G06F 16/182* | (2019.01) | |
| *G06Q 20/38* | (2012.01) | |
| *G06F 16/27* | (2019.01) | |
| *G06Q 10/0631* | (2023.01) | |
| *G06F 40/186* | (2020.01) | |
| *G06F 40/174* | (2020.01) | |
| *G06F 21/64* | (2013.01) | |
| *G06V 30/418* | (2022.01) | |
| *G06F 16/13* | (2019.01) | |
| *G06F 16/248* | (2019.01) | |
| *G06F 16/23* | (2019.01) | |
| *H04L 9/00* | (2022.01) | |
| *G06Q 20/02* | (2012.01) | |
| *H04L 9/08* | (2006.01) | |
| *H04L 9/32* | (2006.01) | |

(52) U.S. Cl.
CPC ...... *G06F 16/1837* (2019.01); *G06F 16/2358* (2019.01); *G06F 16/248* (2019.01); *G06F 16/27* (2019.01); *G06F 21/64* (2013.01); *G06F 40/174* (2020.01); *G06F 40/186* (2020.01); *G06Q 10/06314* (2013.01); *G06Q 20/02* (2013.01); *G06Q 20/3827* (2013.01); *G06Q 50/16* (2013.01); *G06V 30/418* (2022.01); *H04L 9/0637* (2013.01); *H04L 9/0643* (2013.01); *H04L 9/0825* (2013.01); *H04L 9/3236* (2013.01); *H04L 9/50* (2022.05); *G06Q 2220/00* (2013.01)

(56) References Cited

U.S. PATENT DOCUMENTS

| | | | |
|---|---|---|---|
| 6,321,202 | B1 | 11/2001 | Raveis, Jr. |
| 6,658,624 | B1 | 12/2003 | Savitzky et al. |
| 6,684,196 | B1 | 1/2004 | Mini et al. |
| 7,124,354 | B1 | 10/2006 | Ramani et al. |
| 7,568,104 | B2 | 7/2009 | Berryman et al. |
| 7,640,204 | B2 | 12/2009 | Florance et al. |
| 7,801,739 | B2 | 9/2010 | Smith |
| 7,725,359 | B1 | 10/2010 | Katzfey et al. |
| 7,818,219 | B2 | 10/2010 | Klivington et al. |
| 8,046,389 | B2 | 10/2011 | Ritter |
| 8,095,427 | B1 | 1/2012 | Buxton |
| 8,165,939 | B1 | 4/2012 | Reass et al. |
| 8,200,713 | B2 | 6/2012 | Cacenco et al. |
| 8,417,625 | B2 | 4/2013 | Bannerjee et al. |
| 8,423,469 | B2 | 4/2013 | Marlow et al. |
| 8,433,650 | B1 | 4/2013 | Thomas |
| 8,442,906 | B1 | 5/2013 | Thomas |
| 8,880,538 | B1 | 11/2014 | Petersson |
| 9,330,375 | B2 | 5/2016 | Allison et al. |
| 9,672,524 | B2 | 6/2017 | Papa et al. |
| 10,002,398 | B1 | 6/2018 | Isaacson |
| 10,084,600 | B1 | 9/2018 | Irwan et al. |
| 10,102,265 | B1 | 10/2018 | Madisetti et al. |
| 10,109,027 | B1 | 10/2018 | Stack |
| 10,404,471 | B1 | 9/2019 | Griffin et al. |
| 10,521,780 | B1 | 12/2019 | Hopkins, III et al. |
| 10,552,525 | B1 | 2/2020 | Allison et al. |
| 10,608,824 | B1 | 3/2020 | Praus et al. |
| 10,616,324 | B1 | 4/2020 | Kaddoura |
| 10,713,714 | B2 | 4/2020 | Porter et al. |
| 10,776,879 | B1 | 9/2020 | Floyd |
| 10,832,357 | B1 | 11/2020 | Pagliano |
| 10,878,522 | B2 | 12/2020 | Blackman et al. |
| 10,887,357 | B2 | 1/2021 | Hardee et al. |
| 10,911,219 | B2 | 2/2021 | Ardashev et al. |
| 10,943,294 | B1 | 3/2021 | Tarmann et al. |
| 2001/0047282 | A1 | 11/2001 | Raveis |
| 2003/0074248 | A1 | 4/2003 | Braud et al. |
| 2003/0187756 | A1 | 10/2003 | Klivington et al. |
| 2003/0233316 | A1 | 12/2003 | Hu et al. |
| 2004/0083164 | A1 | 4/2004 | Schwartz et al. |
| 2004/0267595 | A1 | 12/2004 | Woodings et al. |
| 2005/0177389 | A1 | 8/2005 | Rakowicz et al. |
| 2006/0085330 | A1 | 4/2006 | Imrey et al. |
| 2006/0235715 | A1 | 10/2006 | Abrams et al. |
| 2006/0288269 | A1 | 12/2006 | Oppenlander et al. |
| 2007/0089053 | A1 | 4/2007 | Uhlig et al. |
| 2007/0121850 | A1 | 5/2007 | Klos et al. |
| 2007/0157079 | A1 | 7/2007 | Baker |
| 2007/0244798 | A1 | 10/2007 | Weidenbenner |
| 2008/0091700 | A1 | 4/2008 | Brotherson et al. |
| 2008/0091954 | A1 | 4/2008 | Morris et al. |
| 2008/0133572 | A1 | 6/2008 | Verhey-Henke |
| 2009/0048938 | A1 | 2/2009 | Dupray |
| 2009/0319927 | A1 | 12/2009 | Beeman et al. |
| 2010/0064166 | A1 | 3/2010 | Dubnicki et al. |
| 2010/0100522 | A1 | 4/2010 | Allison et al. |
| 2010/0145902 | A1 | 6/2010 | Boyan et al. |
| 2010/0293108 | A1 | 11/2010 | Gurvitch et al. |
| 2011/0270766 | A1 | 11/2011 | Ramakrishnan et al. |
| 2011/0276395 | A1 | 11/2011 | Gaton et al. |
| 2011/0289010 | A1 | 11/2011 | Rankin et al. |
| 2011/0289106 | A1 | 11/2011 | Rankin et al. |
| 2012/0221944 | A1 | 8/2012 | Bloomfield et al. |
| 2012/0231814 | A1 | 9/2012 | Calman et al. |
| 2012/0246084 | A1 | 9/2012 | Marshall |
| 2013/0144683 | A1 | 6/2013 | Rappaport et al. |
| 2013/0198598 | A1* | 8/2013 | Kirsch ............... G06F 16/957 715/224 |
| 2013/0262290 | A1 | 10/2013 | Hanson |
| 2013/0290195 | A1 | 10/2013 | Frazier et al. |
| 2013/0318426 | A1 | 11/2013 | Shu et al. |
| 2013/0339189 | A1 | 12/2013 | Minerick |
| 2014/0019318 | A1 | 1/2014 | Haberaecker et al. |
| 2014/0164255 | A1 | 6/2014 | Daly et al. |
| 2014/0279573 | A1 | 9/2014 | Coats et al. |
| 2014/0337189 | A1 | 11/2014 | Barsade et al. |
| 2015/0052080 | A1 | 2/2015 | Letzeiser |
| 2015/0081497 | A1 | 3/2015 | Patel et al. |
| 2015/0089345 | A1 | 3/2015 | Marimuthu et al. |
| 2015/0178252 | A1 | 6/2015 | Dunn et al. |
| 2015/0261795 | A1 | 9/2015 | Medeiros et al. |
| 2015/0317295 | A1 | 11/2015 | Sherry et al. |
| 2016/0019197 | A1* | 1/2016 | Iasi .................. G06F 40/174 715/224 |
| 2016/0028552 | A1 | 1/2016 | Spanos et al. |
| 2016/0071178 | A1 | 3/2016 | Perriello et al. |
| 2016/0110825 | A1 | 4/2016 | Heine, III |
| 2016/0260171 | A1 | 9/2016 | Ford et al. |
| 2016/0292262 | A1 | 10/2016 | Matsumoto |
| 2016/0300234 | A1 | 10/2016 | Moss-Pultz et al. |
| 2016/0342977 | A1 | 11/2016 | Lam |
| 2017/0005804 | A1 | 1/2017 | Zinder |
| 2017/0010680 | A1 | 1/2017 | Bryant |
| 2017/0039604 | A1* | 2/2017 | Sze .................. G06Q 30/0276 |
| 2017/0046806 | A1 | 2/2017 | Haldenby et al. |
| 2017/0076408 | A1 | 3/2017 | D'Souza et al. |
| 2017/0177898 | A1 | 6/2017 | Dillenberger |
| 2017/0186116 | A1 | 6/2017 | Poll et al. |
| 2017/0212781 | A1 | 7/2017 | Dillenberger |
| 2017/0232300 | A1 | 8/2017 | Tran et al. |
| 2017/0236104 | A1 | 8/2017 | Biton |
| 2017/0243193 | A1 | 8/2017 | Manian et al. |
| 2017/0243286 | A1 | 8/2017 | Castinado et al. |

(56) References Cited

U.S. PATENT DOCUMENTS

| | | |
|---|---|---|
| 2017/0286389 A1 | 10/2017 | Ceneviva et al. |
| 2017/0308872 A1 | 10/2017 | Uhr et al. |
| 2017/0329980 A1 | 11/2017 | Hu et al. |
| 2017/0344656 A1 | 11/2017 | Koren et al. |
| 2017/0345011 A1 | 11/2017 | Salami et al. |
| 2017/0352012 A1 | 12/2017 | Hearn et al. |
| 2017/0366353 A1 | 12/2017 | Struttmann |
| 2018/0005186 A1 | 1/2018 | Hunn |
| 2018/0019867 A1 | 1/2018 | Davis |
| 2018/0053265 A1 | 2/2018 | Lyon |
| 2018/0096362 A1 | 4/2018 | Kwan |
| 2018/0108089 A1 | 4/2018 | Jayachandran |
| 2018/0117446 A1 | 5/2018 | Tran et al. |
| 2018/0117447 A1 | 5/2018 | Tran et al. |
| 2018/0130050 A1 | 5/2018 | Taylor et al. |
| 2018/0137479 A1 | 5/2018 | Mirakhor |
| 2018/0143975 A1 | 5/2018 | Casal et al. |
| 2018/0150835 A1 | 5/2018 | Hunt et al. |
| 2018/0167198 A1 | 6/2018 | Muller et al. |
| 2018/0173719 A1 | 6/2018 | Bastide et al. |
| 2018/0205546 A1 | 7/2018 | Haque et al. |
| 2018/0227116 A1 | 8/2018 | Chapman et al. |
| 2018/0239959 A1 | 8/2018 | Bui et al. |
| 2018/0264347 A1 | 9/2018 | Tran et al. |
| 2018/0285332 A1* | 10/2018 | Aghaiipour ........... G06F 40/174 |
| 2018/0285810 A1 | 10/2018 | Ramachandran et al. |
| 2018/0293648 A1 | 10/2018 | George |
| 2018/0329945 A1 | 11/2018 | Horii et al. |
| 2018/0337847 A1 | 11/2018 | Li et al. |
| 2018/0341930 A1 | 11/2018 | Moir et al. |
| 2018/0349621 A1 | 12/2018 | Schvey et al. |
| 2018/0349867 A1 | 12/2018 | Trieflinger |
| 2018/0365201 A1 | 12/2018 | Hunn et al. |
| 2018/0375840 A1 | 12/2018 | Moy et al. |
| 2019/0013932 A1 | 1/2019 | Maino et al. |
| 2019/0034404 A1 | 1/2019 | Anderson et al. |
| 2019/0058581 A1 | 2/2019 | Wood et al. |
| 2019/0066068 A1 | 2/2019 | Mitchell et al. |
| 2019/0066101 A1 | 2/2019 | Mitchell et al. |
| 2019/0073729 A1 | 3/2019 | Cheng-Shorland et al. |
| 2019/0087547 A1 | 3/2019 | Collen et al. |
| 2019/0087598 A1 | 3/2019 | Adkins et al. |
| 2019/0102761 A1 | 4/2019 | Pandian |
| 2019/0114334 A1 | 4/2019 | Gunther |
| 2019/0179806 A1 | 6/2019 | Reinsberg et al. |
| 2019/0208414 A1 | 7/2019 | Roennow et al. |
| 2019/0236733 A1 | 8/2019 | Fenn |
| 2019/0253434 A1 | 8/2019 | Biyani et al. |
| 2019/0266683 A1 | 8/2019 | Burns |
| 2019/0268140 A1* | 8/2019 | Kandiraju ............. H04L 9/3265 |
| 2019/0279321 A1 | 9/2019 | Sheets et al. |
| 2019/0295182 A1 | 9/2019 | Kfir et al. |
| 2019/0311343 A1 | 10/2019 | Cantrell et al. |
| 2019/0311447 A1 | 10/2019 | Strnad |
| 2019/0325044 A1 | 10/2019 | Gray |
| 2019/0332711 A1 | 10/2019 | Ramachandran et al. |
| 2019/0339668 A1 | 11/2019 | Biernat et al. |
| 2019/0361917 A1 | 11/2019 | Tran et al. |
| 2019/0370866 A1 | 12/2019 | Lawbaugh et al. |
| 2019/0372779 A1 | 12/2019 | Monica et al. |
| 2019/0385240 A1 | 12/2019 | Lee et al. |
| 2020/0005403 A1 | 1/2020 | Patterson et al. |
| 2020/0007343 A1 | 1/2020 | Evans |
| 2020/0034940 A1 | 1/2020 | Parikh et al. |
| 2020/0042989 A1 | 2/2020 | Ramadoss et al. |
| 2020/0327498 A1 | 10/2020 | Weber et al. |
| 2020/0374126 A1 | 11/2020 | Karame |

OTHER PUBLICATIONS

Yarbrough, Karen A. "Bockchain Pilot Program Final Report," May 30, 2017, http://cookrecorder.com/wp-content/uploads/2016/11/Final-Report-CCRD-Blockchain-Pilot-Program-for-web.pdf.

Deloitte Center for Financial Services. "Blockchain in commercial real estate." downloaded Jul. 12, 2011, https://www2.deloitte.com/content/dam/Deloitte/us/Documents/financial-services/us-dcfs-blockchain-in-cre-the-future-is-here.pdf.

Loeffler, Evan L. "12 ways to Foul Up a Real Estate Transaction."GP/Solo Law Trends & News. Real Estate. vol. 2, No. 3. Apr. 2006.

Connel, Justin. "How Much Does it Cost to run a Full Bitcoin Node?" News Bitcoin.com, Feb. 23, 2017.

Cecchetti, Ethan et al. "One File for the Price of Three: Catching Cheating Servers in Decentralized Storage Networks." Hacking Distributed blog, Aug. 6, 2018.

Van Dijk, Marten et al. "Hourglass Schemes: How to Prove that Cloud Files are Encrypted." CCS'12 (Acm Conference on Computer Security), 2012.

Peck, Morgen E. et al. "How They Work and Why They'll Change the World." IEEE Spectrum, Oct. 2017.

Errors and Omissions Lawsuit Tips for Real Estate Professionals. Insureon Blog. Apr. 16, 2014. http://www.insureon.com/blog/post/2014/04/16/e-and-o-for-real-estate.aspx.

Meeco ("Zero Knowledge Proofs of the Modern Digital Life for Access, Control, Delegation and Consent of Identify and Personal Data," Mar. 13, 2018. https://media.meeco.me/public-assets/white_papers/Meeco_Zero%20Knowledge%20Proofs%20of%20the%20modern%20digital%20life_V1.0_20180513.compressed.pdf (Year: 2018).

Jianwen Chen, et al., An AI Based Super Nodes Selection Algorithm in BlockChain Networks, PDF submitted Aug. 1, 2018 via https://arxiv.org/abs/1808.00216 (Year: 2018).

Linda Willemse, The Apex Node Ecosystem Explained: Supermodes, Votemodes and Data Cloud Nodes, Jul. 10, 2018, via hackermoon.com (Year: 2018).

Sudhir Khatwani, What is a Mastemode and How is it Useful for Cryptocoin Investors, Jun. 13, 2018, www.coinsutra.com via web.archive.org Aug. 26, 2018 (Year: 2018).

* cited by examiner

Fig. 4.

Form Elements — Add Form Elements — 134

| Headers 131 | 132 | 133 |
|---|---|---|
| ID | Name | Actions |
| -Kjjb610zxa9OSSTB0Jn | Property Access Information | ✎ |
| -Kjjej1XPMPMxREHUjQA | Additional Information | ✎ |
| -Kjo0VNib_Cf-le3Igck | Scheduling Information | ✎ |
| -KjobB7rgxSkPg_IdXR3 | Roof Inspection Information | ✎ |
| -KjokX87utyXX1MqcMee | Sewer Lateral Inspection Information | ✎ |
| -Kjop1WCMgL7iULINaIG | Termite Inspection Information | ✎ |
| -Kjou-KStD4Br94eBGrM | Sign Post Installer Information | ✎ |
| -KjoyilGdGmUvXMJzS7X | Property Overview | ✎ |
| KjoynfjmiYQGdYJrVLP | Community | ✎ |
| -KjoytNzbBYYO0PevqL4 | Schools | ✎ |

135 points to -Kjjb610zxa9OSSTB0Jn

130 — Mark Stevens

Fig. 5.

META | INPUTS | EXPERT

◯ Mark Stevens ▽

VIEWING DRAFT ▽ | ACTIONS ▽

Last Published At: 09/15/2017
Last Edited At: 09/15/2017

Document Name:
48 Hour Notice of Inspection Prior to

Revision Month    Revision Year
4          ▷     2011      ▷

☑ Listings    Priority for Listings
                    0
☐ Offers      Priority for Offers
                    0              ⟨

Locales
Uses Inclusion Strategy
☐ Global
◯ Cities  ◯ Counties  ● States  ◯ Countries
Add states

[ California, USA ⊗ ]

— 141
— 140
— 142
— 143
144

**48-HOURS NOTICE OF INSPECTION
PRIOR TO TERMINATION OF TENANCY** 144

To: [_____] ("Tenant")

And any other occupant(s) in possession of the premises located at:

[_____]
(Street Address)     [_____](Unit/ Apartment #)

[_____](City)    [_____](State)    [_____](Zip Code)
("Premises").

PURPOSE OF NOTICE: When the Tenant requests an initial inspection, the Landlord and the Tenant must try to agree on a mutually convenient date and time for the inspection. The inspection cannot be scheduled earlier than two weeks before the end of the tenancy or lease term. In any event, the inspection should be scheduled to allow the Tenant ample time to perform repairs or do cleaning identified during the initial inspection. The Landlord must give the Tenant at least 48 hours' advance written notice of the date and time of the inspection whether or not the parties have agreed to a date and time for the inspection. The Landlord is not required to give 48-our notice to the Tenant if: (i) the parties have not agreed on a date and time, and the Tenant no longer wants the inspection; or (ii) the Landlord and Tenant have agreed in writing to waive (give up) the 48-hour notice requirement.
1. Pursuant to California Civil Code Sec. 1950.5, you are hereby notified that the Landlord or Landlord's agent ("Landlord") will be making an initial inspection of the Premises prior to the examination of your tenancy for the purpose of giving you an opportunity to remedy deficiencies (consistent with your rental agreement), in order to avoid certain deductions from your security deposit.
2. The inspection of the Premises prior to the termination of your tenancy will be conducted on [_____] at [_____] (☐ AM/ ☐ PM)

Fig. 7 (Con'd).

| 1120 Rose Avenue | Mark Stevens ▽ |

Cover Sheet

- Cover Sheet ⊙
- Documents
- Listing Services
- Marketing Services

101

102

Listing Agent ← 103

Select Agent
Mark Stevens ▼

Seller(s) information ← 104

Adam Able
Adam.Able@gmail.com
(408) 365-1234
1120 Rose Avenue
Mountain View, CA
94040

EDIT     ADD SELLER 2

Important Dates ← 105

Contract Date *
Friday, December 8th 2017

On Market Date*
Friday, December 22nd 2017

Property Information ← 106

Property Being Sold

APN Number
189-23-023

Street*
1120 Rose Avenue
SAME AS ABOVE

Apt/Unit/Suite Number

City*          State*        Zip Code*
Mountain View  CA            94040

Fig. 10.

Document Templates — 71

| Template Name ▽ 72 | Revision Date ▽ | Appears in Listings? ▽ 73 | Appears in Offers? ▽ 74 | Last Published on ▽ 75 | Last Edited on ▽ 76 | Local Type ▽ 77 | Assigned Locals ▽ 78 |
|---|---|---|---|---|---|---|---|
| 1031 Exchange BES Buyer | 11/2009 | | Offers | Nov 21 2017 3:35 pm | | states | CA |
| 1031 Exchange SES Seller | 11/2009 | Listings | Offers | Nov 21 2017 3:36 pm | | states | CA |
| 1031 QA Copy | 11/2009 | Listings | | Dec 4 2017 3:01 pm | | | Global |
| 48 Hour Notice Of Inspection Prior to Termination of Tenancy FEHN | 4/2011 | Listings | Offers | Sep 15 2017 1:34 pm | | states | CA |
| Add Info Regarding Termination of Tenancy within One year After Foreclosure CAR | 11/2012 | Listings | Offers | | Oct 17 2017 4:26 pm | states | CA |
| Addendum Buyer | 12/2015 | | | Nov 21 2017 3:44 pm | | states | CA |

○ Mark Stevens ▷ — 79

ADD DOCUMENT TEMPLATES

Fig. 14.

Residential Listing Agreement

RESIDENTIAL LISTING AGREEMENT
(Exclusive Authorization and right to sell)

Date Prepared: 12/08/2017
1. EXCLUSIVE RIGHT TO SELL: Adam Able ("Seller")
hereby employs and grants Reside Real Estate ("Broker")
beginning (date) ▓▓▓▓▓ and ending at 11:59 P.M. on (date) ▓▓▓▓▓ ("Listing Period")
the exclusive and irrevocable right to sell or exchange the real property described as
1120 Rose Avenue , situated in ▓▓▓▓▓ (City),
Santa Clara (County), California, 94040 (Zip Code), Assessor's Parcel No. 189-23-023 ("Property").
☐ This Property is a manufactured (mobile) home. See addendum for additional terms.
☐ This Property is being sold as part of a probate, conservatorship or guardianship. See addendum for additional terms.

2. LISTING PRICE AND TERMS:
191 → A. The listing price shall be: Nine Hundred Fifty Thousand Nine Hundred Dollars ($ 950,900 ←192 ).
B. Listing Terms: ▓▓▓▓▓

3. COMPENSATION TO BROKER:
Notice: The amount or rate of real estate commission is not fixed by law. They are set by each Broker individually and may be negotiable between Seller and Broker (real estate commissions include all compensation and fees to Broker).
A. Seller agrees to pay to broker as compensation for services irrespective of agency relationship(s), either ☐
▓ 5 ▓ percent of the listing price (or if a purchase agreement is entered into, of the purchase price), or ☐
▓ $ ▓ AND ▓▓▓▓▓ , as follows:
(1) If during the Listing Period, or any extension, Broker, cooperating broker, Seller or any other person procures a ready, willing, and able buyer(s) whose offer to purchase the Property on any price and terms is accepted by Seller, provided the Buyer completes the transaction or is prevented from doing so by Seller.

190

210

Fig. 16 (Con'd).
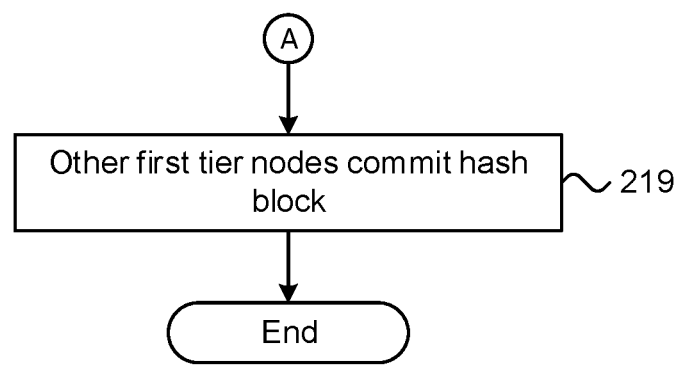

230

350

SINGLE-TIER BLOCKCHAIN-BASED SYSTEM AND METHOD FOR DOCUMENT TRANSFORMATION AND ACCOUNTABILITY

FIELD

This application relates in general to document transformation and maintenance, and in particular to a single-tier blockchain-based system and method for document transformation and accountability.

BACKGROUND

Real estate purchases and sales are the largest financial transactions and investments for many people, especially with the increasing cost of real estate. Due to the cost and time required for a real estate transaction, many individuals are infrequently involved in such transactions and may not be familiar with regulations governing the transactions and issues that can arise. Additionally, real estate transactions are complex and involve many details and issues. Accordingly, many purchasers and buyers choose to hire a knowledgeable advocate to assist with the transaction, including a real estate agent, broker, or lawyer. Real estate agents and brokers can provide a party to such transaction with useful information, including options and risks regarding the transaction. Further, agents and brokers have legal and financial responsibilities to ensure that a transaction is successfully performed and that the transaction complies with all applicable guidelines and regulations.

Over the years, the amount of documentation involved in supporting real estate transactions and financing of such transactions has grown. The required documents have become increasingly numerous and complex, and assuring compliance has become more difficult. The documentation requirements generally differ from one community to another, so agents and brokers must pay attention to the differences in local regulations. They must also keep up with changes in the regulations for all of the relevant governing bodies for every transaction. Also, governing bodies are overlapping and any transaction occurring within the jurisdiction of both governing bodies, must comply with the regulations of the governing bodies. For example, there are often separate regulations for a neighborhood, city, county and state in which a piece of property is located.

Ensuring compliance with all guidelines and regulations can be time consuming and difficult. However, failure to comply with the regulations can potentially invalidate real estate transactions and can expose real estate brokers and agents to litigation and possible liability for failed transactions.

Currently, most real estate transactions are preformed manually, requiring an individual, such as an agent or broker, to identify, collect, and populate documents required to complete a real estate transaction. The agent or broker must also ensure that the documents contain any updates and are correctly populated. Such manual tasks can be time consuming due to a number of documents required and the different requirements established by differing regulations between governing bodies.

Additionally, real estate brokers and agents representing clients are expected to oversee the checking of real estate records, such as via a title company. Due diligence includes checking public records to verify that the person selling the property is the last recorded owner and that there are no gaps in the history. For instance, in the United States, counties maintain land records and file records of new transactions. Typically, the county clerk maintains a database of property records and the history of the transfer of property from one owner to the next is knowns as a chain of title. Although the law does not require that deeds be filed with the county, in some areas, there may be consequences for not filing. If a deed is not recorded, this creates a missing link in the chain of title in the public record. In most jurisdictions, if a title dispute turns into a lawsuit, the most recently filed deed on record typically takes precedence over a deed that has not been recorded.

Property transactions also include other important information that is part of the public record, including records of easements. A right-of-way easement grants other designated groups of people specific kinds of access to the property. For example, owners may be required to grant neighbors the right to travel over their land or they may be required to give the gas company the right to access a pipe buried on their land. A property easement is recorded with the county. Similarly, a right-of-way grant may give an owner access to a neighboring property. For example, the driveway to an owner's property may not be entirely on the owner's land. The grant may involve some responsibilities, such as mowing or maintaining the land. A buyer of property may discover a right-of-way grant that has gone through multiple previous owners.

A property seller usually receives a payment or "consideration" in exchange for granting a transfer of ownership. If the buyer is taking out a mortgage to buy property, then a lender will be involved. Lenders require clear title and typically require title insurance. Title insurance insures against financial loss from defects in title to real property and from the invalidity or unenforceability of mortgage loans. If the property owner has had others work on the property and has not paid them, there may be liens or debts on the property which need to be resolved when a property is sold.

In summary, real estate transactions require much checking before a title should be transferred or moneys should be exchanged. Often considerable money is at stake. These factors create a large and ongoing need for accountability and transparency in the documentation and processes of real estate transactions. Real estate agents and brokers must ensure that the document packages are correctly and carefully generated, and title for the property of the transaction is clear. Such errors and other failures to comply with the required regulations can invalidate a transaction and can expose agents and brokers to costly litigation, as well as stain a reputation of the agent or broker.

In recent years, news reports from many sectors of society have led to increased public awareness about society's vulnerability to computer failures. The news media frequently report on cyberattacks, identity theft and data loss as well as data leaks, threats to information infrastructure, and privacy concerns. Governments have become more concerned and active in trying to protect and regulate computer systems. At the same time, the public use and dependence on the internet has raised general expectations that computer services should be rapid, accurate and reliable and that important government-maintained public records should have appropriate transparency for public use.

To support the incontrovertible associations of property assets with their legal titles, both the public and stakeholder transaction documents for real estate transactions need to accurately and transparently represent and immutably preserve enduring property and transaction information. Trust and reliability in real estate transactions depend on the certainty that everything is accounted for. However, the current foundations for keeping records of real estate transactions rely on an aging and fragmented set of institutions and legacy computer systems that were created before modern computer safeguards were understood and made widely available.

An institutional challenge of the current approach is that the diverse records concerning real estate transactions, such as county property records logs, financial records, title records, and so on are held by multiple and diverse institutions, in diverse and varied formats on computer systems with widely varying security procedures, transparency, and provisions for public access. Every stakeholder institution has its own data security procedures and its own policies regarding data backup and use of redundancy for security and is potentially and individually vulnerable to human and computer-based tampering. There is much room for improvement in creating systems with comprehensive access, tamperproof guarantees and validity checks, and robust archiving for all of the historic records in property transactions.

Real estate agents and brokers need to cope with a myriad of stakeholder institutions with their legacy data bases and transaction-supporting processes that evolved in an ad hoc fashion as institutions adapted computers to support their businesses and daily activities. There is a growing gap between stakeholders' experience of real estate transactions and growing public expectations for instantaneous and reliable access to public records including records of property ownership. The challenges of compliance and transparency and enduring accountability today also create unnecessarily high costs for real estate transactions. Further, although the stakeholder institutions in real estate transactions use computers and communication devices for messaging in the back-office work of supporting real estate transactions, most of the work is manual, time-consuming, error-prone, and expensive.

Blockchain is a continuously growing set of record or "blocks" that form a ledger of transactions. The blocks are linked and secured by cryptographic methods and provide an approach that is trustworthy and transparent for the storage of the blocks. At least one county, Cook County, Ill., has utilized blockchain technology to transfer and track property titles. See, https://www.forbes.com/sites/forbesrealestate-council/2018/01/12/three-ways-blockchain-could-trans-form-real-estate-in-2018/#2ef0cd403638 (Jan. 12, 2018). Upon purchase of property in Cook County, the purchaser receives a digital token and a traditional paper deed. Documents that accompany the digital token can be used as proof of ownership. The approach by Cook County utilizes a Colored Coins protocol, which is built over the Bitcoin blockchain to allow the digital tokens to be generated. See Yarbrough, Karen A., Blockchain Pilot Program Final Report (May 30, 2017). However, such approach by Cook County fails to address the scalability problem of continuous property transactions and lack of storage space for the transactions, and fails to include a two-tier blockchain approach.

Further, other possibilities of blockchain utilized in the real estate industry include recording key terms of a lease agreement on the blockchain and initiating payment of a security deposit and rent through Bitcoin wallets or bank accounts. See https://www2.deloitte.com/content/dam/Deloitte/us/Documents/financial-services/us-dcfs-blockchain-in-cre-the-future-is-here.pdf (downloaded Jul. 12, 2011). Possession of the property is transferred to the purchaser and the agreement is recorded. However, no details regarding how such steps are performed on the blockchain are provided.

Therefore, a need remains for assuring transparency and accountability for property ownership records and other real estate transaction information.

SUMMARY

Real estate brokers manage and drive real estate transactions. Brokers try to provide services that meet the best needs of their clients while dealing with the business challenges of complying with all governing regulations over real estate transactions, achieving transparent and enduring accountability over a diverse set of documentation, and coordinating multiple parties and containing the unnecessarily high costs of business.

Transactions and their document packages must be compliant with all governing regulations. Real estate regulations vary by region, with requirements at each level including federal, state, county, city, and sometimes neighborhood. Failure to comply with the regulations can potentially invalidate real estate transactions and can expose real estate brokers and agents to costly litigation [Loeffler, 2006], [Insureon Blog, 2014]. With today's complexity in regulations for real estate transactions and documentation, there is a substantial risk of human error. This situation has created a growing and unmet need for technological support and services for assuring document compliance for brokers and agents.

Real estate agents and brokers need to cope with a myriad of stakeholder institutions with their legacy data bases and transaction-supporting processes that evolved in an ad hoc fashion as institutions adapted computers to support their businesses and daily activities. There is a growing gap between stakeholders' experience of real estate transactions and growing public expectations for instantaneous and reliable access to public records including records of property ownership. The challenges of compliance and transparent and enduring accountability today also create unnecessarily high costs for real estate transactions. This situation has created a growing and unmet need for technological support and services for assuring enduring transparency and accountability for transaction information.

Real estate transactions can be extremely complex and generally require many documents for review and execution to formalize the transaction. Currently, such transactions are performed manually via a real estate agent or broker that fills out each document. However, manual processing of the documents often results in inconsistencies of data across the documents, incorrect data values based on a failure to identify and enter updated values, data values that are not compliant with local regulations, and other errors. Ensuring the correctness of the documents is extremely important because errors in the documents may invalidate the associated real estate transaction. Representations of documents that enable both human usability and automation by allowing data entry and automated checking of the data helps ensure data completeness, consistency, compliance, and correctness of the documents.

A blockchain-based method for document transformation and accountability is provided. Document templates for real property transfer are maintained. Each template includes data fields each associated with a data field identifier. A subset of the document templates are collected as transaction documents for a transaction for the transfer of real property. The data fields of the transaction documents are populated with received data values via the data field identifiers of the data fields. Compliance checking is performed on the populated data values. The transaction documents are provided to a network having a first tier of network nodes and a second tier of supernodes. One of the supernodes is selected to validate the transaction documents. The validated transaction documents are added to a ledger of transactions and an immutable summary record, such as a cryptographic hash, of the validated transaction documents is transmitted to the first tier. Other types of immutable summary records are possible. At a minimum, the immutable summary record should be deterministic, short in length, such as a fixed-length, computable, and uncorrelated with hash values of related text. One of the network nodes is selected to commit the summary record of the validated transaction documents to a blockchain of the first tier. The record of the validated transaction documents is committed to copies of the blockchain stored by the other network nodes in the first tier.

A further embodiment provides a single-tier blockchain-based system and method for document transformation and accountability. Transaction documents including document templates relating to a transfer of real property are maintained. Each template includes form elements. The form elements are each associated with a data field identifier and a data value. A data model is maintained for the transaction documents and includes the data field identifiers and the data values for the form elements. A request is received for the transaction documents. The form elements of the transaction documents are automatically populated with the data values via the data model in response to the request. Compliance checking is performed on the data values populating the form elements. A cryptographic hash of the transaction documents is committed to a blockchain copy stored by one or more network nodes in a single-tier when no errors are identified in the data values during the compliance checking.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 4 is a screenshot showing, by way of example, an interactive form for form element identifiers.

FIG. 5 is a diagram of an interactive form showing, by way of example, a document template with defined form elements.

FIG. 10 is a diagram showing, by way of example, a document template library.

FIG. 14 is a diagram of a document template with data fields for property price.

DETAILED DESCRIPTION

Glossary

Figure 1:
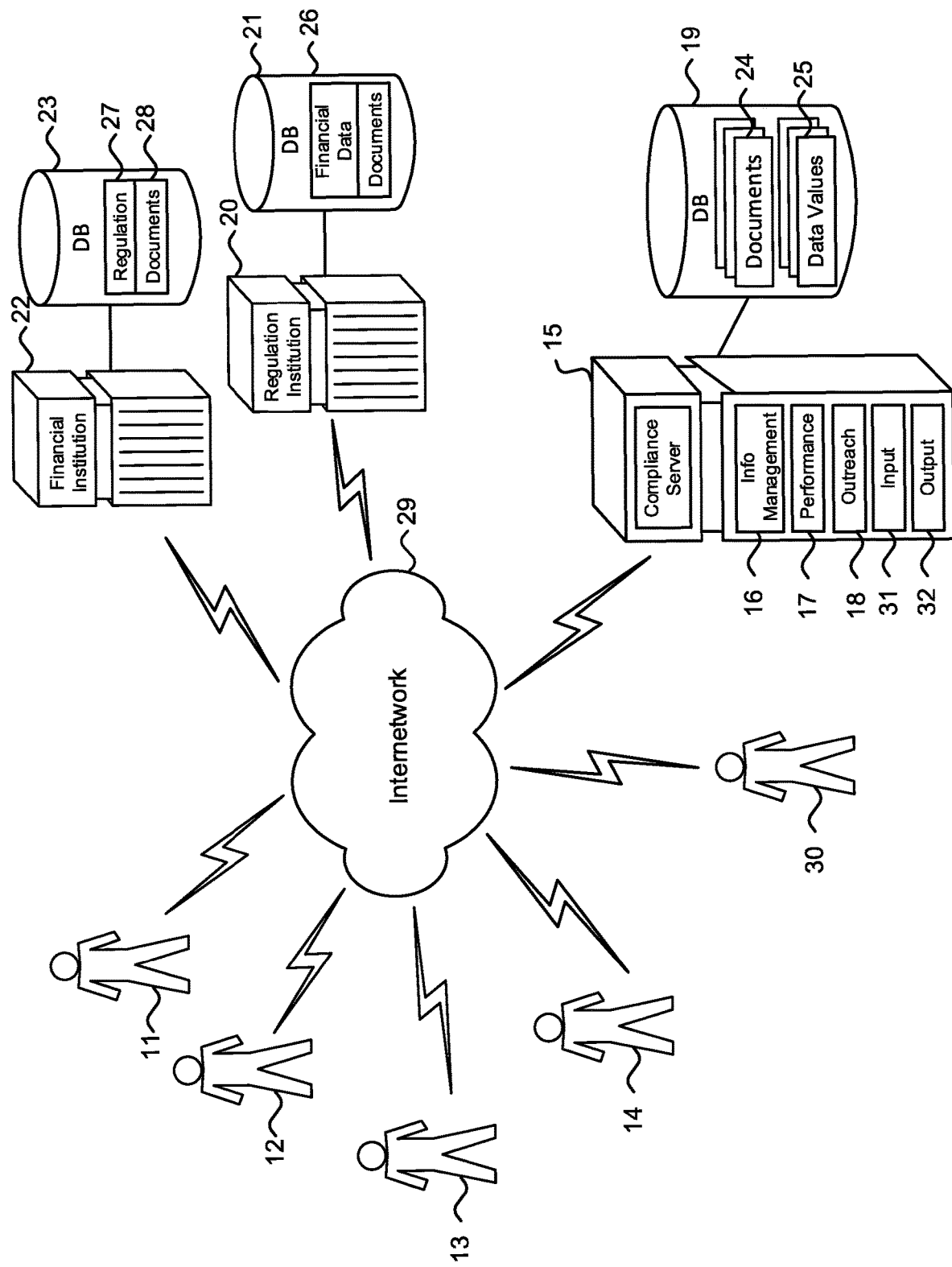
FIG. 1 is a block diagram showing a system for document grouping and transformation, in accordance with one embodiment.

Document package—a document package refers to a collection of documents prepared for, signed, and executed by parties of a real estate transaction. The package can include documents for listings or offers, including documents about real estate services performed in support of transactions, such as proofs of availability of funds, contracts with real estate agents and brokers, disclosures, inspection reports, and marketing agreements, as well as other types of documents. Different subsets of a document package may be provided to different parties of a transaction. For example, different documents are typically provided for buyers and sellers.

Completeness—testing a document package for completeness refers to automated testing to ensure that all of the required documents are included in the package and that all required fields in the documents are filled out. When specific information is provided as a value for a field, a trigger can add additional fields to the document beyond the initial fields displayed. Additionally, received data may also trigger one or more additional documents to be added to the document package.

Consistency—testing documents for consistency refers to automated testing to ensure that values of related fields in the documents are filled out in a semantically-consistent way. For example, every "initials" field for the same person should contain the same initials. Additionally, fields that have different representations for the same information (e.g. "one thousand dollars" versus $1,000.00) should have the same or compatible meanings. All related fields should convey consistent meanings.

Correctness—testing documents for correctness refers to automated verification that data values and combinations of related fields have been verified by one or more authoritative sources. For examples, entries specified for street address, City, County, State, and Zip Code correspond to a correct combination recorded by an authoritative entity. The specified street address is within the specified city, the specified city is within the specified county, the specified county is within the specified state, and the zip code corresponds properly to the combination, and the property exists. Another example is that information about a "parcel number" for a property paired with an address corresponds to county land records. Another example is a bank statement vouching for the availability of funds. There can be different requirements on what it means for a source to be "authoritative," including having a well-known identity, using secure and digitally-signed communications, meeting government-approved requirements, backing by financial guarantees, and meeting certification requirements of legal, real estate, and banking institutions.

Compliance—testing documents for compliance refers to automated testing to ensure that the data values provided in the documents and the transactions proposed comply with all legal requirements. For a successful property transaction, no required documents can be omitted and the document versions must meet current requirements. In real estate transactions, there are often multiple governing organizations, including federal, state, county, city, and sometimes local organizations such as property owner associations. State and federal laws require that purchasers of property be informed of certain conditions of the property for consumer protection. Further, governing organizations may require disclosure of the nature, limitations, and conflicts regarding the responsibilities of the real estate agents. Compliance requires that the document package be complete, consistent, and correct.

Confirmation—brokers and agents are obligated to inform their clients about important information in the transactions. Common practice for compliance for avoiding potential legal liability is to provide explicit places in the documents for dated confirmation signatures on documents and for particular data fields. The steps involved include assuring that the documents include proper places for signatures or initials and dates in the documents presented to clients and others and also checking that a document package is thoroughly checked that all required signatures or initials are properly filled out and dated by clients.

Active documents—refer to programmatically-supported information that can be presented in a human-readable and legally appropriate form ("documents") in a computational medium, with a computational substrate ("active document) that enables people to fill in or select information and to interact with it, that efficiently supports information processing of the information such as checking it for completeness, consistency, correctness, compliance and confirmation. In this way, active documents support understanding and processing of information by people and active computational agents intended to assure that a real estate transaction is compliant with requirements.

Transaction identifier—a string of numbers and/or letters that uniquely identify a specific transaction of property.

Form element—corresponds to a region on a form that takes a value from a data field.

Form element identifier—a string of numbers and/or letters that are unique to a particular form element in a document.

Form element name—a human-readable name used to describe and identify a particular form element in a document.

Data field—location for storage of data, such as in a database.

Data field definition—human-readable information describing an associated data field in the database to which the data field definition is assigned and can include data field identifiers.

Data field identifier—a string of numbers and/or letters that uniquely identify a specific data field in the database.

Data field values—data values that populate a data field.

Bureau of Real Estate (BRE)—is a state level agency that makes rules for real estate transactions.

Conveyance—is the act of transferring an ownership interest in real property from one party to another. Conveyance also refers to the written instrument, such as a deed or lease that transfers legal title of a property from the seller to a buyer.

Escrow—refers to money held by a third-party on behalf of transacting parties. The duty of a title and/or escrow company is to act as a neutral third party. The escrow company holds all documents and money until all of the terms and conditions in the contract have been met and the property is in title insurable condition. The transfer can then be made from the Seller to the Purchaser. Title companies do not work for the Seller or for the Purchaser. They are employed by both parties and act only upon mutually agreed upon written instructions. In Arizona, a title company, or an escrow company, rather than an attorney, serves this purpose.

Title—is a bundle of rights in a piece of real estate in which a party may own either a legal interest or equitable interest. The rights in the bundle may be separated and held by different parties. It may also refer to a formal document, such as a deed, that serves as evidence of ownership. Conveyance of the document may be required in order to transfer ownership in the property to another person.

Title insurance—is a form of indemnity insurance which insures against financial loss from defects in title to real property and from the invalidity or unenforceability of mortgage loans. The vast majority of title insurance policies are written on land within the United States. Unlike some land registration systems in countries outside the US, the US states' recorder of deeds generally does not guarantee indefeasible title to those recorded titles. Title insurance will defend against a lawsuit attacking the title or reimburse the insured for the actual monetary loss incurred up to the dollar amount of insurance provided by the policy.

Listing Agent—represents the seller in a real estate transaction.

Buying Agent (also known as Selling Agent)—represents the buyer in a real estate transaction.

Compliance

Real estate transactions are complicated and time consuming. Currently, such transactions are performed manually by a real estate agent or broker for a stakeholder, which is commonly the buyer or seller of a property that is the focus of the transaction. The manual process includes identifying and collecting required documents for all governing jurisdictions, identifying and applying all relevant and current jurisdictional regulations to the documents, populating the document with required data, checking that the populated data is consistent, accurate and compliant with the regulations, revising the documents when information changes, incorporating new information arising from negotiations between the parties of the transaction, adding new documents when new requirements are enacted, providing the completed documents to the other party of the transaction, and coordinating signatures of the documents. However, due to the increasing number of documents and constantly changing regulations, there is a substantial risk of human error, which can, at times, invalidate the transaction. Further, even if the documents are completed electronically, computers are currently unable to verify or ensure compliance of the populated data based merely on the electronic preparation of the transaction documents.

Automatic document transformation and compliance can prevent error and reduce an amount of time required to identify and complete the required documents. However, automating such document transformation, especially for real estate transactions, is challenging and many factors must be considered to ensure that automated document transformation and compliance is accurate, quick, and reliable. The challenges include designing representations for documents and document packages that enable both human usability and automation. Specifically, the document information should be presentable in natural language, able to be printed or presented in digital media, while also ensuring that the information is in a form practical for information processing. The information processing can include symbolic and numeric processing of data values entered into the documents, including determining whether fields are populated with proper values, enabling entry of data fields manually or automatically and comparing the data values with reference values and constraints. To perform such steps, information processing can require access and integration with one or more databases, networked information exchange with trusted and authoritative servers, and maintaining a history or log of changes to the documents and data values. Other challenges include integrating automated information processing with ongoing human activities with respect to the documents, including automatically keeping track of a status of multiple interdependent activities and related services, coordinating activities and document changes, and managing incremental and ongoing document and information changes, such as ensuring compliance when information changes during a transaction. To overcome such challenges, the automatic document transformation system, as discussed in detail below, includes a multi-tier system that utilizes data models for checking and automating compliance, as well as computational agents, and multiple networked, authenticated and cloud-based servers, which allow a computer to perform the task of compliance. A compliance status of documents and field values can change as information changes during a transaction.

Compliance System Architecture and Operation

Document transformation and compliance checking reduces errors during real estate transactions to ensure that the transactions are successfully and timely completed. FIG. 1 is a block diagram showing a system for document grouping and transformation, in accordance with one embodiment. Real estate agents 11 or brokers 12 assisting a party or stakeholder 13 to a real estate transaction can access a compliance server 15 via an internetwork 29, such as the Internet, to identify, prepare, and verify documents for the transaction as a compliance system 15. The real estate agents and clients of the real estate agents or brokers can access, fill in, and sign documents for the transaction, as described in commonly-owned U.S. patent application Ser. No. , titled "System and Method for Document Transformation and Compliance, filed Sep. 4, 2019, the disclosure of which is herein incorporated by reference. In a further embodiment, the compliance system 15 can be executed by two or more servers.

In one embodiment, the compliance system 15 can operate via a cloud computing environment, which allows users, such as the agents, brokers, and parties to the transaction, to access and utilize remotely-stored applications (not shown) of the compliance system without requiring the users to install software or personal data. The users can access the compliance system 15 via a computing device, such as a computer or a mobile computing device (not shown), including a cell phone, laptop, or tablet.

The compliance system 15 can include a compliance information management system 16, a compliance performance system 17, a compliance outreach system 18, an input port 31 to receive compliance rules, databases of addresses and document templates, and an output port 32 to provide populated and checked document packages for a transaction. The compliance information management system 16 encodes information and logic representations for automating compliance of the transactions. Real estate subject matter experts 14 and information technology specialists 30, among other individuals, are responsible for the creation and maintenance of the information and logic used by the compliance system 15. For example, subject matter experts 14 can curate and annotate a library of documents 24 for real estate transactions that is stored by a database 19 associated with the compliance system 15. The library of documents is discussed in detail below with respect to FIG. 10. The documents reflect different jurisdictional transaction requirements, including federal, state, county, city, and local compliance requirements. Meanwhile, information technology specialists 30 can encode, check, embed, and maintain compliance logic executed by computational agents of the compliance system with the documents in the library and associated databases.

The information management system 16 also enables the compliance performance system 17 to support and automate real estate transactions. For instance, the compliance performance system 17 records information for a transaction, selects a set of documents for the transaction based on at least a portion of the recorded information, and transforms documents in the set by populating form elements of one or more of the documents processed by the information management system 16. The real estate brokers 12, agents 11, support staff, and parties 13 can provide the information for the transaction via a form or coversheet. Based on the received information, the compliance performance system can populate the documents on which automatic compliance is performed.

During or after population, the performance system 17 performs compliance checking of the document set for consistency, correctness, completeness, and compliance, as well as confirmation. The compliance outreach system 18 interacts with third-party institutions 20, 22, as authoritative sources, to access transaction documents 28, jurisdictional regulations 27, property records (not shown), and financial data 26 for compliance checking with the set of populated documents. The third-party institutions can include city or county property records, real estate boards, financial institutions, or jurisdictional real estate regulatory institutions, including federal, state, county, city and neighborhoods jurisdictions. Other third-party institutions and document types are possible.

Any errors in the documents regarding consistency, completeness, correctness, and compliance of the data can be identified via the performance system 17. In one embodiment, errors are detected at the time data is entered. The error can be flagged, making a visible note for stakeholders and preventing an erroneous value from being accepted and propagated in the document set. The note can suggest corrections to the data entry or prompt a user to correct the entry at that time. In another embodiment, the errors can be automatically corrected; however, in a further embodiment, a notification can be transmitted to one or more of the broker, agent, or stakeholder for correction. Any time new data is entered, the compliance checking process can automatically occur to ensure that no errors are present in the transaction document set. Once the documents are complete and correct, the documents can be provided to the other party of the transaction for review and possibly, further revision.

Figure 2:
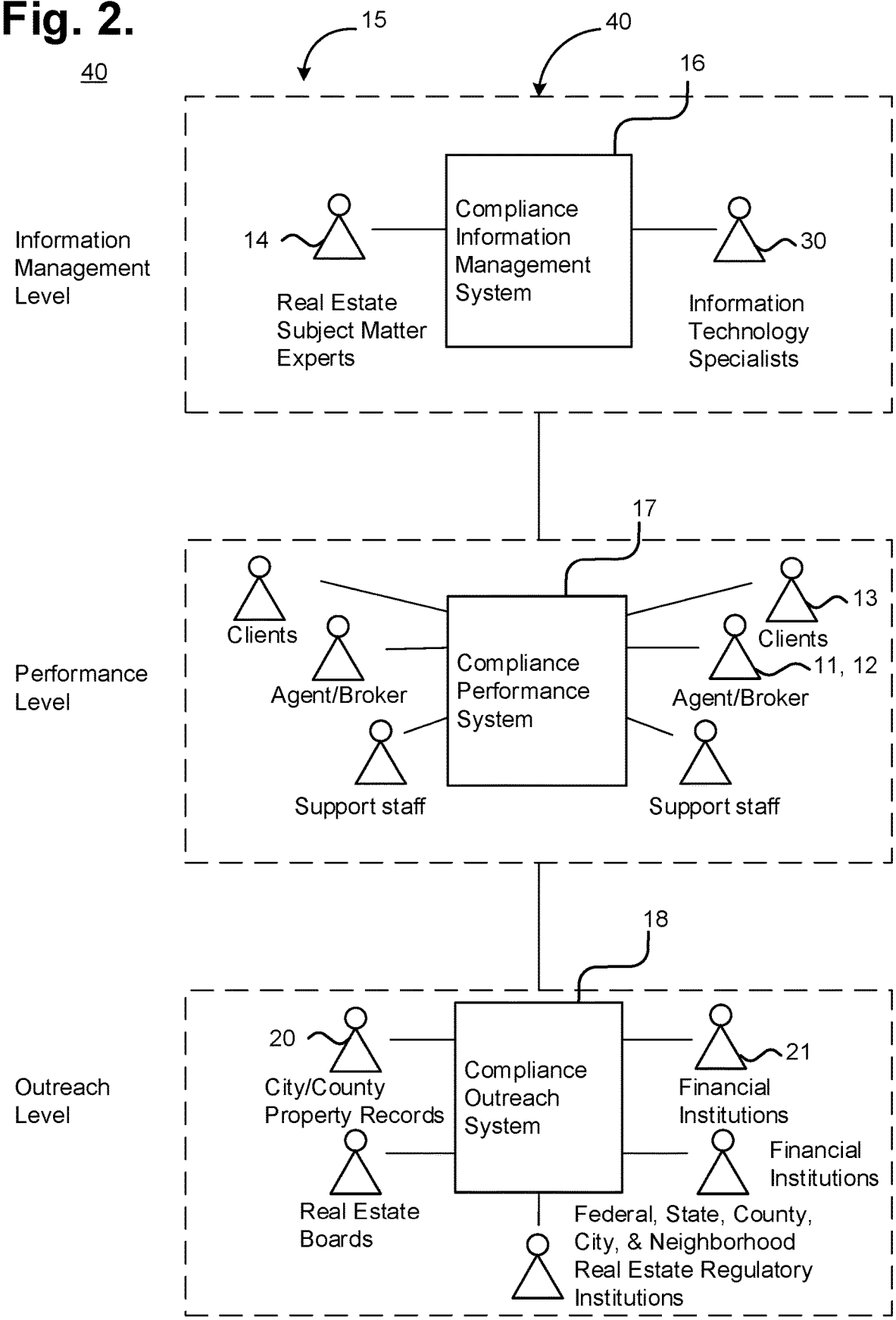
FIG. 2 is a block diagram showing, by way of example, the compliance system of FIG. 1.

The compliance information management system 16, compliance performance system 17, and compliance outreach system 18 work in conjunction with each other to automate document transformation and compliance checking. FIG. 2 is a block diagram 40 showing, by way of example, the compliance system 15 of FIG. 1. As described above, the compliance system 15 includes the compliance information management system 16, the compliance performance system 17, and the compliance outreach system 18. At the level of the compliance information management system 16, real estate subject matter experts 14 and information technology specialists 30 provide information and logic representations that are encoded and saved for performing compliance checking of the populated documents for a real estate transaction.

Documents are identified and populated at the compliance performance system level 17 during which users, such as brokers, agents, and stakeholders to the transaction provide data regarding the transaction for populating at least a portion of the documents using the information and logic representations from the information management system 16. Once populated, compliance logic from the information management level 16 is applied to the documents to check for correctness, completeness, consistency, and compliance of the data and the documents, using the information gathered by the compliance information management system and the compliance outreach system. Prior to or during the compliance checking, the compliance outreach system 18 performs interactions with third party systems to obtain additional information against which the populated documents of the transaction documents are checked.

Documents and Data Fields

Figure 3:
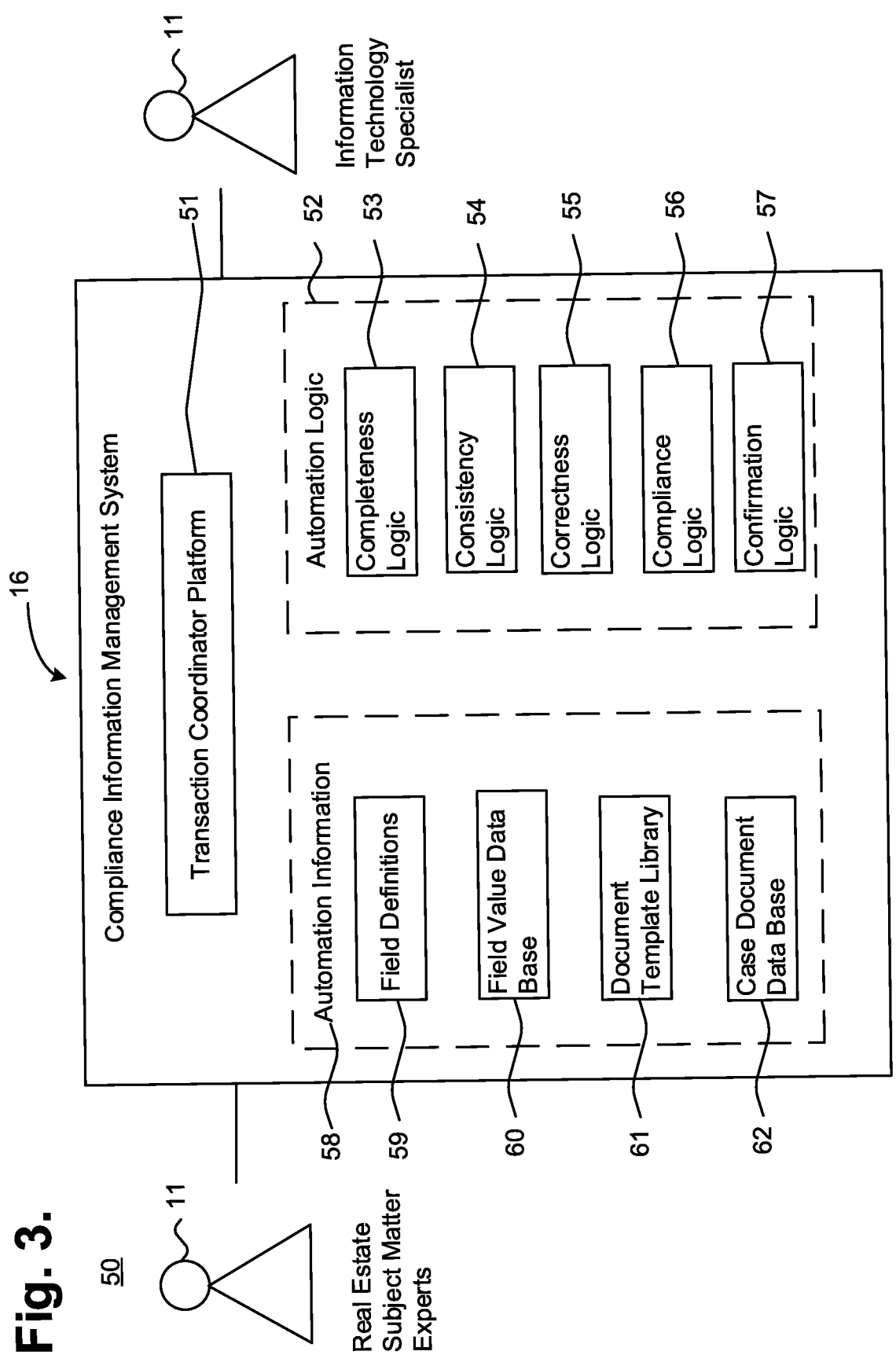
FIG. 3 is a functional block diagram showing, by way of example, the compliance information management system of FIG. 2.

Ensuring accurate document transformation and compliance requires automation information and logic representations. FIG. 3 is a functional block diagram 50 showing, by way of example, the compliance information management system 16 of FIG. 2. Real estate subject matter experts and information technology specialists, among other qualified individuals, enter automation information 58 and automation logic 52 via a transaction coordinator platform 51. The automation information 58 can include field definitions 59, field values 60, a library of document templates 61, and case documents 62, which are human-readable forms of a current state of transaction documents for each transaction, while the automation logic 52 can include population logic (not shown) that performs document population and revision, and review logic to ensure compliance, correctness, completeness, and consistency of the populated documents.

The document templates 61 can be obtained from jurisdictional real estate organizations, generated by the subject matter experts, or uploaded via the subject matter experts or a third party, as well as from other sources. Generally, each jurisdictional real estate organization requires a pledge to a code of ethics and implements a standard of practice required by all members. Many brokers and realtors belong to one or more organizations to utilize document templates prepared, maintained, and updated by the organizations. When new real estate regulations are implemented or laws are enacted, federally or by state, those real estate organizations covering the affected jurisdictions work to revise their documents and ensure that their templates are up to date and in compliance with the new regulations or laws.

Each of the documents in the template library 61 includes multiple form elements for entry of transaction data, including data field values, which are each stored in a data field, such as in a database or spreadsheet. The data fields values are used within a data model for checking and automating compliance, and are accessed for populating the form elements. A real estate document template can include form elements for party names, street address, city, county, zip code, and sales price for the property of the transaction. Each data field that stores a data field value is associated with a data field definition 59, which can be human-readable information describing that data field to which the data field definition is assigned. The data field definition is also associated with a data field identifier, such as a string of numbers and letters, that uniquely identify a specific data field in the database.

The information of the data field definition can include one or more of a text comment describing a meaning of the field, a data type, routines for converting a value into printable text, computational modules for carrying out operations on a field, and a syntax checker. For example, a data field definition for a property address can include a data field name of "street address," a data field identifier of "Street.Address.1," a data type of "street-address," a description of "this is the first street address for the property, must include a number and a street name, and be consistent with a lot number in county records," and a module for operations to carry out entering, printing, checking, comparing a received data value to trigger compliance checking and syntax checking.

The data field identifiers and names index access to populated data values for information processing and support specific access for automating document population and compliance checking, including completeness, consistency, correctness, compliance, and confirmation processing. Specifically, the syntax checker can be used to look up a data field value for populating a form element based on the data field identifier of the data field definition associated with the data field and a transaction identifier assigned to the transaction. For example, returning to the street address example above, a property transaction, in which the data field for street address has been populated, can have an identifier "Trans CAL-387654-Smith-Jones-31-Dec-2018." Based on the transaction identifier and the data field identifier, the street address data value "1302 Broadway E" is accessed and used to populate the data field. Data field identifiers and names for related data fields within a single document or across different documents are the same for different transactions. However, data values populating the data fields are specific to a transaction and are usually different for different transactions. Each transaction can be associated with a data model, which can include the data field identifiers or names for documents in a document package for the transaction and data values that populate data fields associated with the data field identifiers. The data models are discussed in detail below with respect to FIG. 9.

In one embodiment, the field definitions 59 are stored in a persistent data access system, such as a relational database or a NOSQL database. The database is a reference source for field definitions. However, other kinds of linked data structures for the field definitions are possible, such as hash tables, tree-based structures, and look-up representations and information retrieval structures.

In a further embodiment, the field definitions 59 are distributed and combined with a library 61 of the document templates so that the field definitions 59 are defined and stored in a distributed fashion across a set of document templates, rather than in a monolithic database for all document templates. In such embodiments, a document template is designated a reference template and the source of the field definition. Having data represented as explicit data fields enables controlled and specific access to the compliance data and enables automating compliance checking and enforcement.

To access data values and populate form elements in the document templates, the field definitions can be associated with the form elements, such as via a look-up table or stored with the form elements. FIG. 4 is a diagram showing, by way of example, an interactive form 130 for form element identifiers 135. The interactive form 130 can be delivered via a web page or directly by an application. The interactive form 130 includes a listing 131 of "form elements" 135 that can be defined by a real estate expert or information technology specialist and associated with a data field in a document template. Each form element 135 can be represented by a data box in a template and listed via a form element identifier 131. For each form element, the interactive form 130 can provide a name 132 of the element and actions 133, which can be performed for or on the form element that corresponds with the form element identifier 131 and name 132. The actions can include printing of an associated data value, triggering when the data value has changed, converting the data value from a numerical value to text and vice versa, and when a new data value has arrived. Other actions are possible. New form elements 135 can be added using an "add form element" button 134.

Data field definitions can be assigned to the form elements within documents templates by a subject matter expert or real estate professional that can work with information technology specialists to define the data fields. FIG. 5 is a diagram of an interactive form 140 showing, by way of example, a document template 143 with defined form elements 144. The interactive form 140 can include a data frame 141 and a display frame 142, and is displayed to the real estate experts and information technology specialists for entering field definitions to the document templates. The data frame 141 can provide tabs for metadata 141, inputs, and experts, as well as other tabs. The meta data tab 141 provides information for defining the document template 143 and can be populated by the real estate experts and information technology specialists. In turn, the defined document template is provided to the users, such as the real estate agents and clients. Under the metadata tab 141, document information fields can be provided, including a date that the document template was published and last edited, the document name, the date the document template was last revised, a type of transaction covered by the document, and a locale represented by the document.

The display panel 142 can display one or more pages of a document template 143. Each document template displayed can include one or more form elements 144, at least one of which is defined for automated population and compliance. Each defined form element 144 is associated with a data field identifier that indicates a type of data to populate that data field. The defined form elements can be highlighted, color coded, or otherwise marked to indicate a blank field that must be populated by the user.

Figure 6:
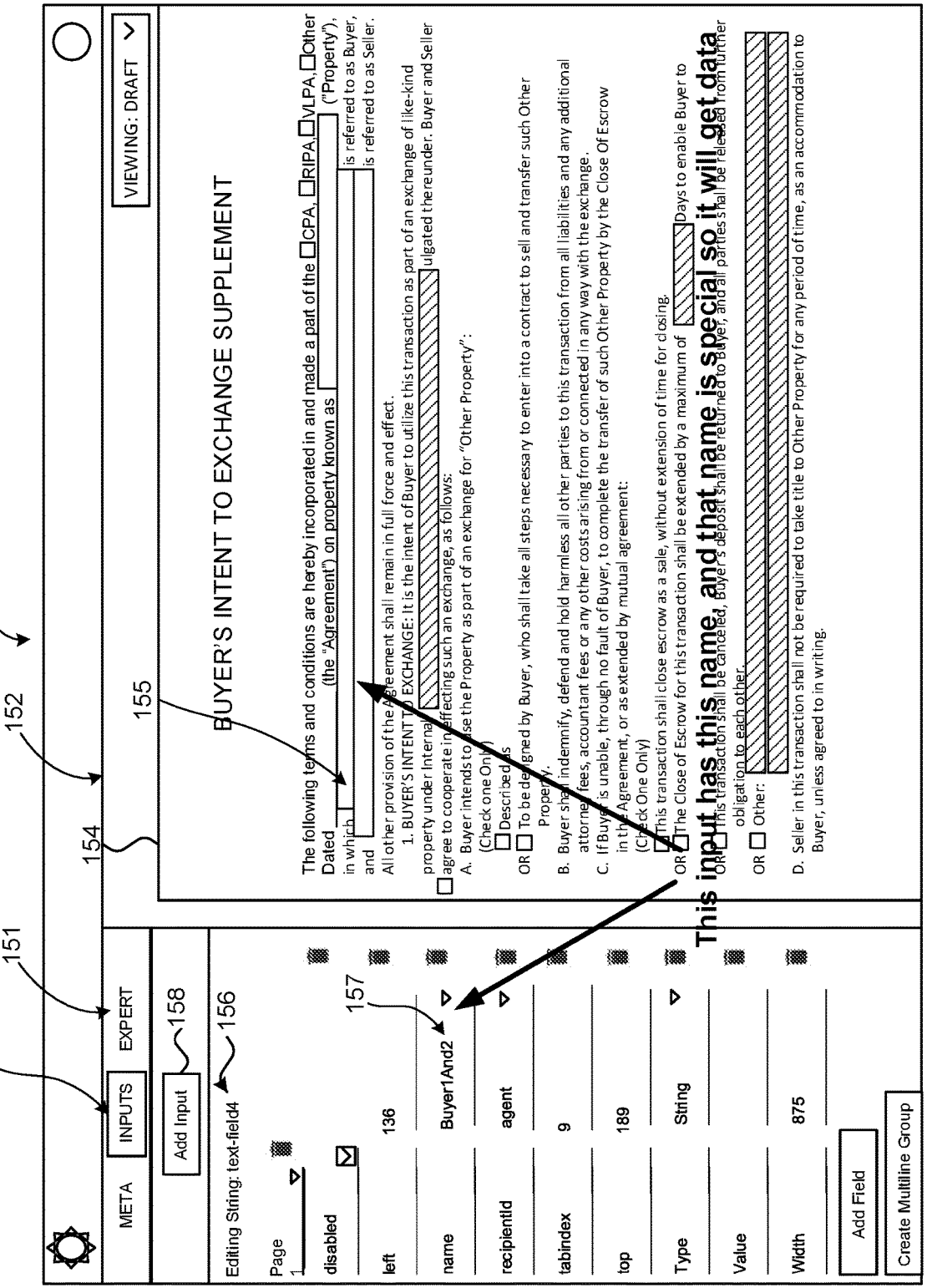
FIG. 6 is a diagram of an interactive form showing, by way of example, information for generating a data field identifier associated with a data field in a document template.

The inputs tab of the data frame can be used by real estate experts and information technology specialists to define a form element with a data field definition or provide information about the field definition associated with that form element. FIG. 6 is a diagram of an interactive form 150 showing, by way of example, information for generating a data field identifier associated with a form element in a document template. The interactive form 150 can include a data frame 151 and a display frame 152. The data frame 151 can include tabs for metadata, input 153, and expert, while the display frame 152 can display a document 154 or a portion of a document 154 with one or more data fields 155. When the input tab 153 is selected, a form element 155 can be defined using an "add input" button 158 after providing information about the form element, including providing an editing string, which can be the form element identifier 156, a page of the document displayed, and a name 157 of the form element identifier, which in this example is "Buyer1And2." Other information, such as tabIndex, top, type, value, and width can be used for formatting of the data field to populate the form element with a data value. The form element identifier 156 provides that the name of Buyer 1 and Buyer 2, if any, should be entered into the form element 155 for which the data field identifier 156 is associated. Under the input tab 153, programming information for triggering processing logic is also included. For instance, selecting a particular box, may add additional form elements to the form for answering by the user or add additional documents to the document package.

A data field definition can also be included in the inputs tab to provide information about the type of data to populate the form element, as well as information regarding where to access the data once received and how to process the data. Once the form elements of a document template have been defined, the template can be added to the document library for access and use by real estate agents for real estate transactions.

Returning to the discussion with respect to FIG. 3, users, such as real estate agents or clients, populate the defined form element with data values, which can be stored in the field value database 60. In one embodiment, the data field values 60 are stored in a persistent data access system, such as a relational database, NOSQL database, or any other persistent data structure that can provide similar indexing functionality. The database 60 functions as a reference source for the data values for all of the documents in the package associated with the transaction. Additional information to assist information processing can be stored together with the data field values or in additional storage. The additional information can include date and time the data was last changed, provenance information about who entered the data or where the data originated, and links to related information, such as confirmation information that logs whether a stakeholder or user has confirmed receipt and acknowledgement.

Automation logic utilizes the automation information, such as the data field identifiers 59, to create and maintain accurate information for automating compliance. The subject matter experts and information technology specialists generate automation logic 52, which includes population logic for automating document transformation and review logic for performing compliance checking of the documents. The review logic can include logic for completeness 53, consistency 54, correctness 55, compliance 56, and confirmation 57, which is encoded by the compliance information management system, to automate compliance of the documents for a transaction. Completeness logic 53 ensures that all required documents for a transaction are included in a document package and that all required form elements for each document in the package are populated. Consistency logic 54 ensures that related fields in the documents are populated in a semantically-consistent way, as further described below with respect to FIG. 14. Correctness logic 55 ensures that the data field values are verified by authoritative sources, as described below in detail with respect to FIGS. 8, 13A, and 13B, and compliance logic 56 ensures that the packaged documents for a transaction comply with all regulatory requirements. Confirmation logic 57 ensures that all of the required signature and date fields in the packaged documents are populated.

Generating Document Packages

Figure 7:
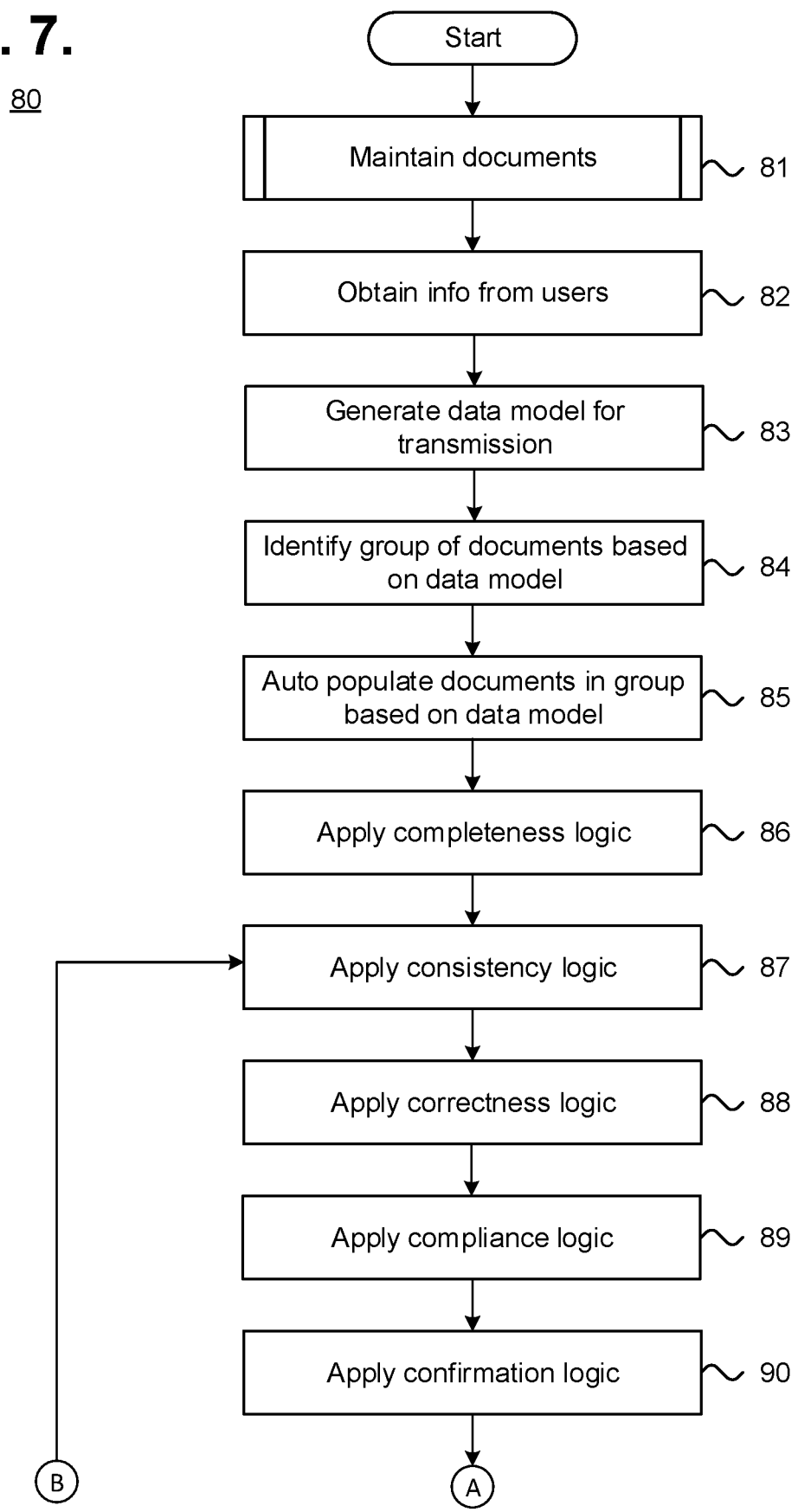
FIG. 7 is a functional block diagram showing a method for document transformation and compliance, in accordance with one embodiment.

Each property transaction generally requires many documents to be completed. Automated document transformation and compliance provides convenient, accurate and timely checking and transformation of the documents to prevent errors. FIG. 7 is a functional block diagram showing a method 80 for document transformation and compliance, in accordance with one embodiment. A library of document templates for real estate transactions is maintained (block 81) for a plurality of jurisdictions. The maintained documents include templates from different real estate organizations or that are newly generated. Each document template in the library has been processed by real estate experts and information technology specialists to group documents for different transactions in different jurisdictions and to define the form elements. The documents can be grouped using a document identifier or by storing related documents in folders; however, other methods for grouping documents are possible.

A user accesses the document transformation and compliance system to generate a document package for a transfer of real property, such as a sale or purchase of the property. The user can include a real estate agent, broker, or other types of real estate professionals, as well as a party to the transaction. Different documents are relevant and appropriate for different stakeholders, which consequently have access to different documents in the document package. For example, a listing agent can create transaction documents shared between a property seller and the listing agent, such as a listing agreement, as well as documents that are provided to another party of the transaction, such as a counteroffer, which is compliance checked and included in the property transaction itself. Similarly, a selling agent can create transaction documents shared between the selling agent and client, and transaction documents, such as an offer, that are provided to another party to the transaction. Further, different users can have different access to the data transformation and compliance system. For instance, real estate agents and brokers cannot sign on behalf of the buyer or seller, whereas the buyer and seller may not be able to access the same document templates as the real estate agent or broker, such as when the documents are only available based on membership in an organization from which the documents originated.

Upon access, the user can provide (block 82) information about the property transfer, such as a type of property transfer or property address, price, type, and owner, via a cover sheet. Specifically, the information can be provided as data values that populate the form elements in the documents. Other types of information are possible.

Based on the data values received from the user, a data model is generated (block 83). The data model can include the data values and data field identifiers for corresponding data field definitions, as well as additional information. Additionally, the data model is updated as data values change, new documents are added, and new form elements are added. Data models are discussed in further detail below with respect to FIG. 9.

Prior to, simultaneously or after generation of the data model, a package of document templates for the transaction can be generated (block 84) based on the received data values. For example, upon receipt of the transaction type and property address, a set of compliance rules can be identified and subsequently, the identified compliance rules can be used to identify documents for including in the document package for the transaction. For example, at least a portion of the documents associated with the city, county, or state in which the property is located can be used to generate the document package. Further, properties located in a particular location may be part of a homeowner's association and the rules of the homeowner's association will apply to the property in the transaction. The document package can be automatically generated based on the received data values or selected by a user. Additionally, the document package can be generated based on a combination of automatic generation and user selected generation. At any point prior to providing the document package to the other party, documents can be removed or added to the package.

Once identified, the documents in the package can be auto-populated (block 85). Specifically, form elements within the documents are populated (block 85) with data values from the cover sheet based on the data field identifiers associated with the form elements. Any form elements in the documents not automatically populated can be filled in by the user. For automatic population, data values from the coversheet, which can be stored in a database with field identifiers, are used as reference sources for populating the form elements of the documents with data field values. Other reference sources for populating the form elements are possible, such as other documents, as discussed in detail below with respect to FIG. 9. The documents can be populated once identified and if further documents are later added to the package, auto-population can occur once the document has been added. Auto-population is also used when data values are changed. For example, if the price of the property changes in one form element, the new price is entered in the data model and will be used to replace the old price in the other documents in the package.

Additional information can be stored with the populated form element values or in additional storage accessible using case and field identifiers. The additional information can include date and time the data was last changed, provenance information about who entered the data or where the data originated, and links to related information, such as confirmation information that logs whether a stakeholder has confirmed receipt and acknowledgement of the data values.

During or after data population, review logic, such as completeness logic (block 86), consistency logic (block 87), correctness logic (block 88), compliance logic (block 89), and confirmation logic (block 90) can be applied to the document package to ensure a validity of the data values. In one example, the review logic is applied in real time as the data values are being entered in the form elements, either via auto-population or via the user. Additionally, the review logic can be applied at a later time, such as all the required data is entered in the documents. For instance, for related form elements, checking cannot occur until multiple fields are entered, either in the same document or across different documents.

The review logic can be applied separately or simultaneously. Once the documents in a package have been checked for compliance, consistency, correctness and completeness, any identified errors or inconsistencies can be automatically corrected or a notification can be provided to the user to correct the error. Once the document package satisfies all checks for completeness, consistency, correctness, compliance, and confirmation, the document package can be provided (block 91) to the other party to the transaction.

However, prior to providing the document package to the other party or after providing the package, updates (block 92) to one or more of the form elements may be required. For example, the other party receiving the document package may want to change a term or form element value in one or more of the documents. Alternatively, one or more terms of the transaction may change, such as based on an outcome of the property inspection or by mutual agreement. Additionally, regulations regarding the transaction can change and must be reflected in the document package. All such changes must be reflected in the transaction documents.

A change to a value populating a form element in a document could, for example, occur via a user interaction when the document is stored in the compliance system or by a fresh upload of a copy of the document. Every change to a data field value is logged and time-stamped. Whenever a new value of the form element becomes available to the compliance system, the system updates the data value in the caching database. Additionally, whenever a new copy of the reference document is made available to the system, the system synchronizes the data so that the most recently updated value is reflected in the database for populating form elements. Other implementations for storing the data field values are possible. In each variation, consistency rules assure that when a change to a referenced data field value for a document package becomes known, the new data value is propagated to derivative form elements across the documents in the document package. To maintain transparency and consistency, the compliance system keeps a log showing the dates and times of any change, and indicates where reconfirmation is required of any stakeholder's acknowledgement of a value. The log can be used to verify and confirm certain changes, as well as track the user that made the change should a dispute regarding the property arise.

If any updates (block 92) to a data field value are necessary, one or more data field values are changed (block 93) and propagated across the documents in the package. Additionally, a change can be made to a form element and that change is updated to reflect across all document templates in a document package that include that form element. Subsequently, the review logic, including completeness logic (block 86), consistency logic (block 87), correctness logic (block 88), compliance logic (block 89), and confirmation logic (block 90) is applied to the updates. Otherwise, if no updates are required, the document package is considered to be successfully complete and can be provided to the other party.

Process and Document Transformations

The document transformation and compliance system helps reduce the amount of time required for preparing documents for a real estate transactions, such as a sale or purchase of property, and increases confidence that the documents are accurately prepared. Generally, during a property sale and purchase transaction, a potential purchaser reviews multiple properties, which have been listed for sale. Each listed property requires a listing agreement, which includes large amounts of information that must be correctly listed for the property and comply with jurisdictional regulations.

Eventually, the potential purchaser identifies an available property for sale and generates an offer for sending to the seller of the listed property selected. Generating the offer can be tedious and time consuming based on the information that must be provided and disclosed. Once the offer is accepted, all paper work for the transaction must be completed before closing. Such paper work includes documents relevant to the particular property and transaction, and can include proof of title search, insurance, flood certification, proof of homeowners insurance and mortgage insurance, home appraisal, inspection reports, and closing disclosure, among other documents, such as carbon monoxide detector notice, new construction addendum, vacant land listing agreement, and water heater statement of compliance. Other types of documents are possible.

Figure 8:
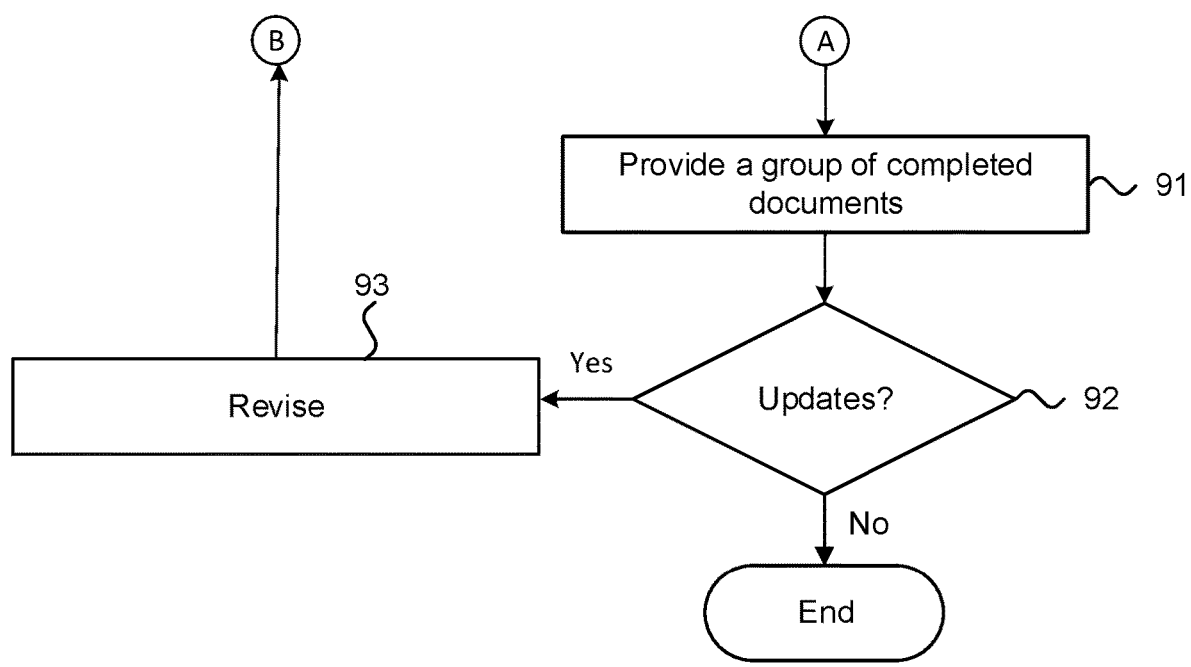
FIG. 8 is a diagram of a webpage showing, by way of example, a transaction cover sheet with data fields for obtaining data values.

Users can utilize the document transformation and compliance system to prepare the listing, offer, and related documents. Such documents are prepared using information received from a user, such as via a questionnaire or cover sheet. FIG. 8 is a diagram of an interactive form 100 showing, by way of example, a transaction cover sheet 102 with form elements for obtaining data values. The interactive form 100 can include a navigation bar for an index 101 of pages for the transaction and a display of the cover sheet 102. The index 101 can include content links for the cover sheet 102, including a document link, listing services link, and marketing service link. The listing services and marketing services are described in commonly-owned U.S. patent application Ser. No. , titled "System and Method for Listing Document Transformation and Compliance," filed on Sep. 4, 2019, and U.S. patent application Ser. No. , titled "Blockchain-Based System and Method for Listing Document Transformation and Accountability," filed on Sep. 4, 2019, the disclosures of which are hereby incorporated by reference. However, other index links are possible, including purchase service links, which can be utilized by a buying party to the transaction, such as described in commonly owned U.S. patent application Ser. No. , titled "System and Method for Purchase Document Transformation and Compliance," filed on Sep. 4, 2019, and commonly-owned U.S. patent application Ser. No. , titled "Blockchain-Based System and Method for Purchase Document Transformation and Accountability," filed Sep. 4, 2019, the disclosures of which are hereby incorporated by reference.

The cover sheet 102 can include multiple form elements, which are used to generate a data model for the transaction. The data fields of the cover sheet can include fields for at least one broker or agent name 103, at least one party name 104, contract and market dates 105, and property information 106, including property identification number, street address, city, state and zip code, and purchase price (not shown). Further, data specific to a seller and his listing agent can be requested via the cover sheet, such as a lock box code to access a key for the property or a gate code to the property, as well as other types of property access information, such as a combination to enter a condominium complex. Other types of form elements are possible. A user, such as an agent, broker or stakeholder, can populate the form elements of the cover sheet 102 with data field values that are used for generating a data model to identify a document package and perform compliance checking. Once the cover sheet has been completed, a check mark or other symbol or color can be used to provide a status of the cover sheet in the index 101, which in this case, is complete.

In one embodiment, one or more compliance checks can be applied via the review logic as the data values are entered into the cover sheet. For example, correctness logic can be used to check data values entered into the form elements of the cover sheet. Specifically, the data values can be checked to prevent propagation of incorrect information in the other documents of the document package. For example, a real estate agent is completing the cover sheet for his client, the seller, and fills out the seller's email address as adam.able.gmail.com. The correctness logic identifies that the email address is invalid due to lacking the conventional syntax character "@" to separate the name of the email holder from the name of the email service and marks the incorrect data value as an error. The error can be provided as a pop-up message or by highlighting the incorrect data value, and can be removed upon correction of the data value. Other displays of the error notification are possible.

The correctness logic can also connect to authoritative sources to retrieve authoritative information for checking the data values. For example, the property for sale is located at 1120 Rose Avenue, Mountain View, Calif. 94040. As the real estate agent types in the address "1120 Rose," an authoritative source, such as a multiple listing service database, is accessed to obtain and display valid property addresses matching the partial address entered. The real estate agent can then select the property address representing the property for sale by Adam Able. Consistency and compliance logic can also be applied to the data values entered in the cover sheet.

Data Models and Process Logic

Figure 9:
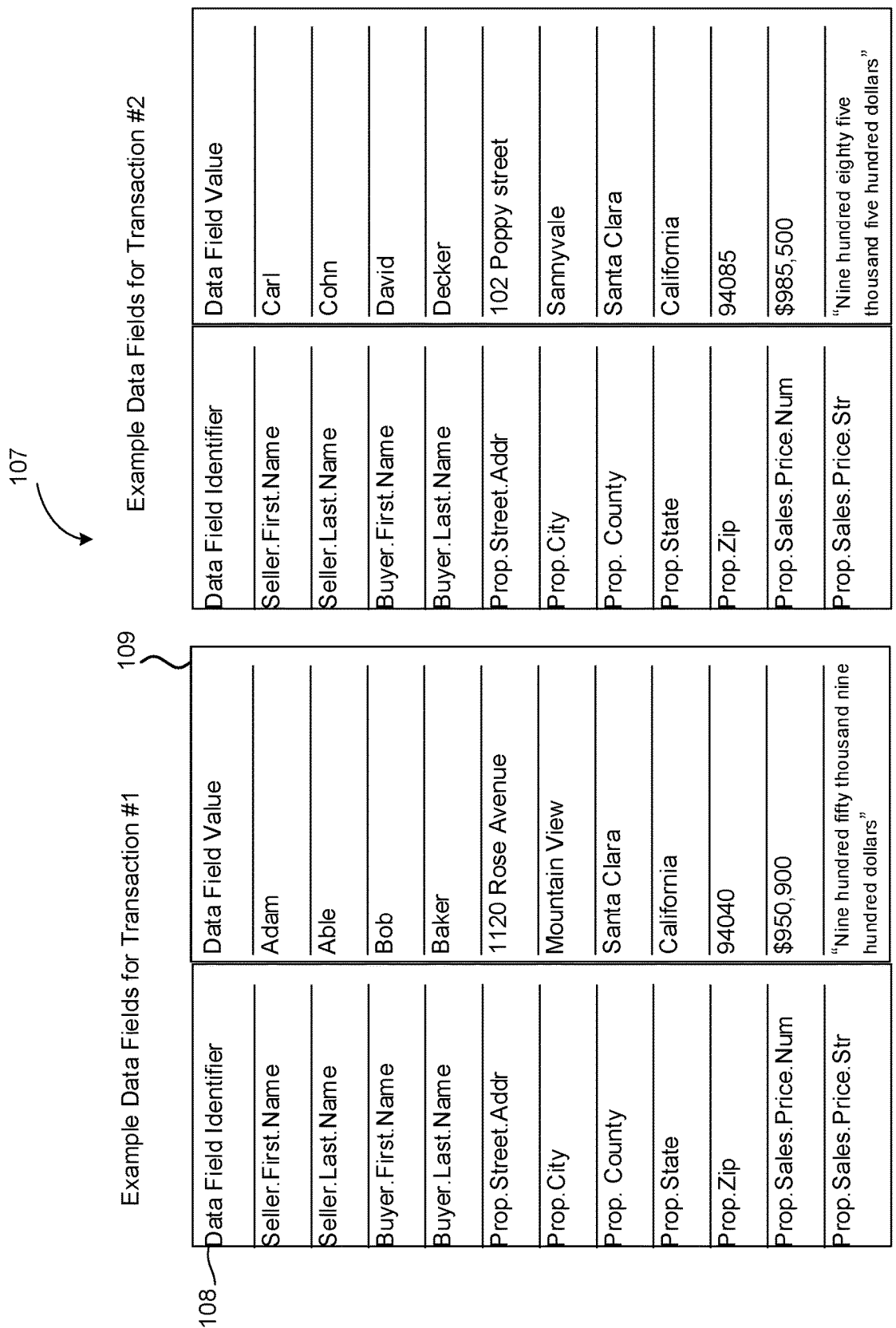
FIG. 9 is a block diagram showing, by way of example, data models.

Once obtained and checked, the data values of the cover sheet are used to generate a data model. FIG. 9 is a block diagram showing, by way of example, parts of data models 107 for different transactions. Each data model can include data field identifiers 108 and data field values 109. In this example, the data field identifiers are associated with a form element in the cover sheet and documents in the library. The data field values are used to populate all form elements with the corresponding data field identifier. The same data field identifiers can be used across documents, as well as transactions; however, the data field values differ for each transaction.

Returning to the above example regarding seller, Adam Able, the seller name is split into two fields with the field for first name associated with a field identifier "seller.first-.name" and the field for last name associated with the identifier "seller.last.name." The received data values of Adam for first name and Able for second name are stored with the associated identifiers in a data model having an extensible set of data field identifiers for accessing and displaying information populating the documents. All the received data values in the cover sheet and document templates for the property transaction can be stored together as the data model.

Once generated, one or more data values from the data model can be used to identify rules for a particular transaction and the identified rules can then be used to select documents for a document package for the transaction.

However, prior to generating a document package, the data values from the data model can be used to populate a disclosure document outlining a relationship between a real estate agency and a seller or buyer. The template for the disclosure document can include interactive fields for ensuring acknowledgement by the seller or buyer, and signature, date, and license fields.

Once the relationship between the real estate agent and buyer or seller has been established, documents can be selected from a document template library for inclusion in the document package. FIG. 10 is a diagram showing, by way of example, a part of a document template library 61. The library 61 provides a listing of document templates 70 that are necessary for meeting compliance regulations and practices for different jurisdictions. Each document template 70 can be stored with information, including template name 71, a date of last revision 72, whether the document appears in a listing 73 of documents relevant to the listing agent and seller, whether the document appears in an offer 74 for the property, last publication date 75, last edit date 76, locale type 77, and assigned locale 78. The assigned locale 78 can list the jurisdiction which requires the document, while the locale type 77 provides a classification for the type of jurisdiction, including city, county, or state, as well as other types of jurisdictions. In one example, each document template 70 can be accessed by clicking on the template name. Further document templates 70 can be added using an "add document template" button 79.

To generate a document package for a transaction, one or more data values received via the cover sheet, such as the property address, can be used to identify a set of rules for the transaction. Subsequently, based on the identified rule set, one or more documents can be selected from the library to form the document package. The transaction can be assigned a unique transaction identifier, which can then be used to uniquely identify the document package. For example, the transaction identifier can be a unique number or string, or could be generated as a string that includes some human-interpretable information, such as the real estate agent's name, seller's name, and a date together with a number.

As more data values are provided for the form elements, additional documents may be identified as required for the transaction. Accordingly, templates for those documents are instantiated and some of the field values can be filled in where they have already been established. In this way, the document package grows incrementally and automatically as needed.

Figure 11:
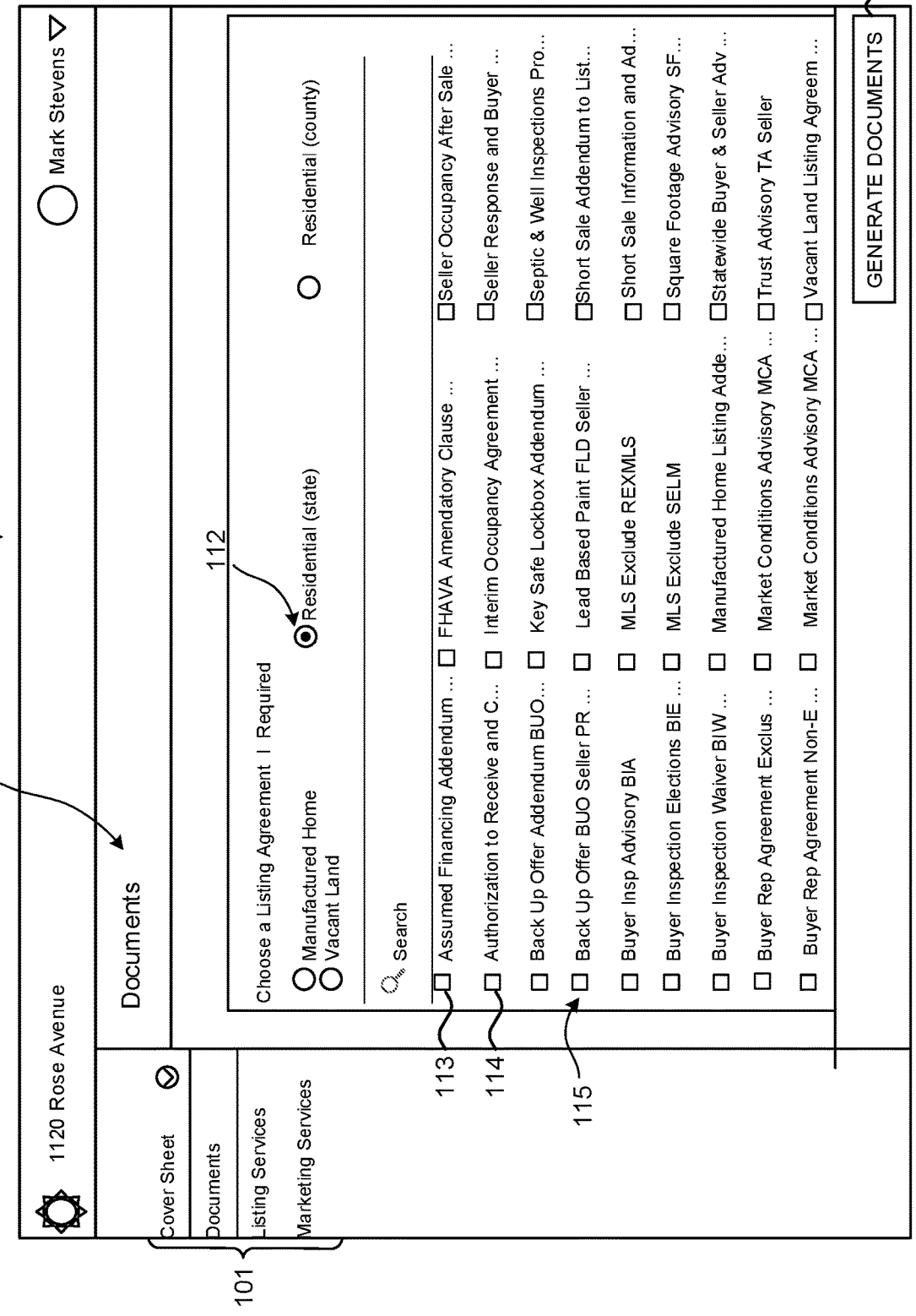
FIG. 11 is a diagram showing by way of example, an interactive form for identifying document templates for a transaction.

In one embodiment, a listing of document templates can be presented and an agent can select one or more documents to add to the document package, as needed. FIG. 11 is a diagram showing by way of example, an interactive form 110 for identifying document templates for a transaction. The interactive form 110 includes a navigation bar for an index of pages 101 and a documents section 111. The documents section 111 provides one or more property type selections 112, a search bar 113, and a listing 114 of document templates 115. The property type selections 112 can be identified and presented based on the address entered in the cover sheet and a type of transaction, such as a selling or buying transaction. Specifically, the address can be used to identify jurisdictional organizations that cover the location of the property, while the transaction type is used to identify listing or purchase documents. For example, a property located in Mountain View, Calif. must comply with real estate regulations enacted by the state of California, as well as any local regulations. To list the property located in the Mountain View for sale, document templates for listing agreements that comply with real estate regulations in one or more of California or locally are identified and presented. A listing agreement represents a contract between a real estate agent and an owner of the property to be sold and can include a list price for the property, a beginning and end date for the property listing, an amount of compensation for the real estate agent, and authorization for the agent to work with third parties to further the sale of the property, as well as other types of information. However, different listing agreements drafted by different organizations can include different conditions based on location, property type, and preference of that organization. For example, one professional organization in California includes, by default, a clause in the listing agreement that requires a property to be delivered to a buyer in operational order, while the listing agreement drafted by a different professional organization does not require, by default, the seller to make any repairs.

The property type selections for the Mountain View property can include a manufactured home, residential home or vacant land, or a residential home however, other property type selections are possible. Thus, document templates for listing agreements for each of the property types that conform with California and local regulations are identified and displayed. The user, such as a real estate agent or broker, can choose one or more of the transaction type selections 112 for generating a document package for the transaction. For example, if the property is a residential home, the user can select residential documents associated with the selected property types are displayed or selected for display in the document template list 114 in the document section 111. In one embodiment, all the documents associated with the selected property types can be selected for display and inclusion in the document package. Alternatively, all the documents associated with the selected property types can be displayed and a user can select certain documents for inclusion in the document package.

Further, the document section 111 includes a search bar 113, which can be used to identify additional document templates for adding to the document package. An agent may use the search bar if he or she has information about the property or transaction that is not evident yet from the information that has been entered in the active documents. In this way, the agent can add relevant documents to the package. For instance, the residential Mountain View property may have water conserving plumbing fixtures, which require an additional document for disclosure or is offered for sale as a short sale, which also requires additional documents. Accordingly, based on those special circumstances, the document templates are accessed via the search bar 113 and added to the document package. Further, the interactive form 110 can include a generate documents button 116, which allows a user to view the document templates selected for inclusion in the document package.

Figure 12:
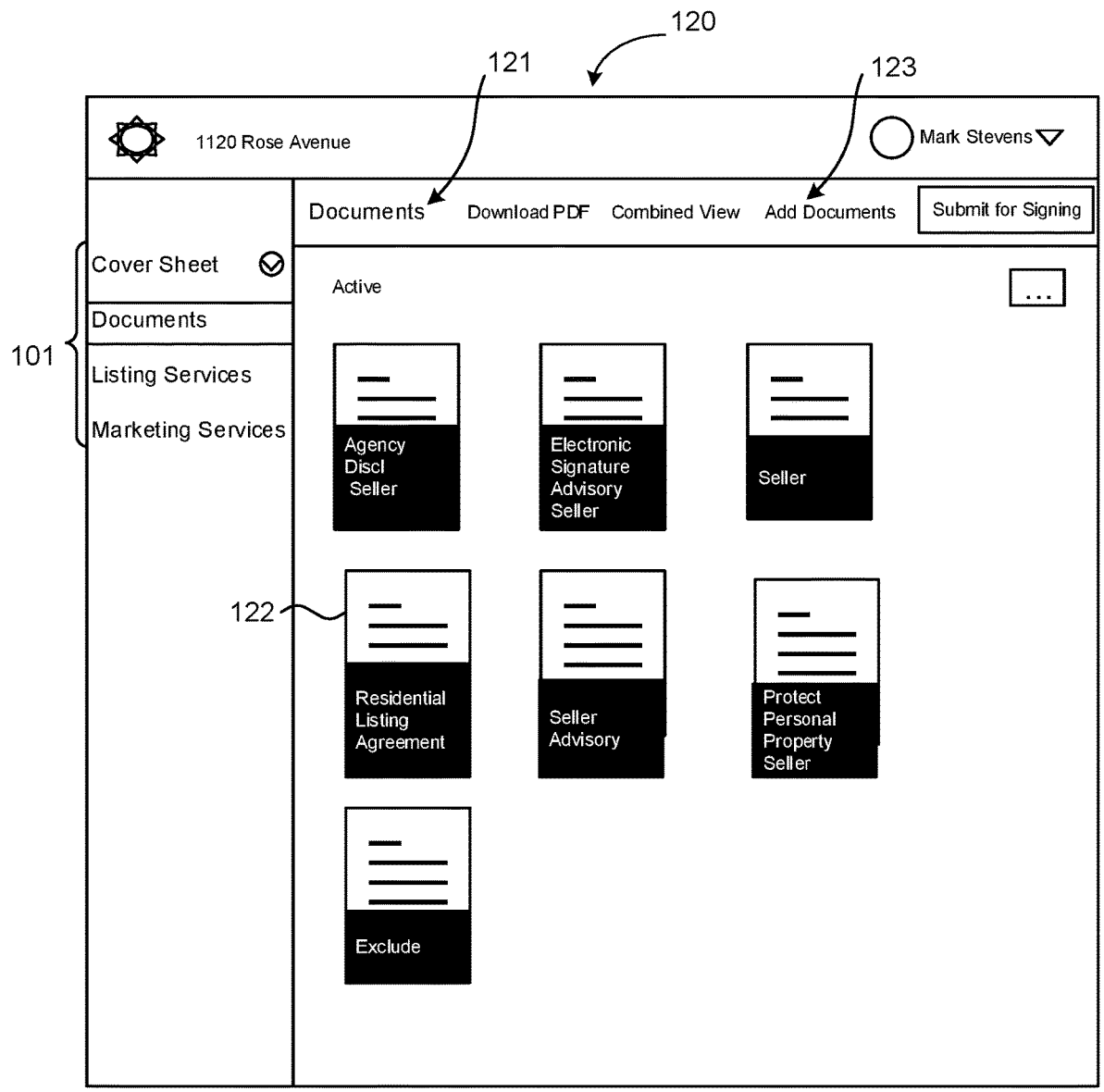
FIG. 12 is a diagram showing, by way of example, an interactive form displaying a document package.

Based on the document template selections in the document page 111, a package of documents is generated for the transaction and displayed to the user. FIG. 12 is a diagram showing, by way of example, an interactive form 120 displaying document templates for possible inclusion in a document package 121. The web page 120 provides a listing of documents 122 for a listing agreement, for example, that can be included in the document package 121 for the property transaction upon confirmation of the transaction. In one embodiment, the documents templates can be displayed as thumbnail images, and selected for review and revision. Each thumbnail representation of the active documents can include a title of the document and a menu, which allows the user to edit or obtain additional information about that document. Each of the documents in the package can be auto-populated with the data values entered in the cover sheet prior to display or upon display. Further, users can upload external documents via an add document button 123 on the interactive form 120. For example, homeowner association guidelines and papers may not be easily available to individuals that do not belong to the homeowner association and thus, can be uploaded.

During auto-population, the population logic processes the documents selected for the package by reviewing the form elements, looking up data field identifiers for the data fields in the data model, and populating the form elements with the data values in the data model that correspond with the data field identifiers. The user can select a thumbnail for each document and review the documents with the populated data values. If any form element remains unpopulated, the user can enter a data value, which is saved with a data field identifier associated with the unpopulated form element and stored in the data model. Other documents in the package that include a form element associated with the data field identifier can be populated with the corresponding data value.

In different embodiments, different methods for looking up the data field values to populate the documents are possible, depending on whether the data field values are stored in a reference database, in a reference document, or in a combination of both. In one example, the data field values for a document package are stored in both a database and a reference document as a value for a corresponding form element. The reference document data field or source includes the data value of record and the database functions as a cache for that value. The cache is used to simplify accelerated data field access for populating other documents. In a different example, the data values can be stored in the data fields of a reference document in the package and any changes to the data values can be made immediately to the respective form elements in the other documents. In a further example, the data values are stored in a database and accessed upon display of the documents in the package. For instance, when a change is made to a data value, the value is changed in the database and the next time the documents in the package are displayed, the fields are populated with the updated values stored in the database just prior to display.

At the same time or after auto-population of the documents, compliance logic can be performed to ensure the completeness, correctness, consistency, and compliance of the documents. Completeness logic helps ensure that all required documents are included in the document package for the transaction and that all required fields for each document are filled in. Rules regarding each form element are associated with the field definitions and based on the information provided by the field definition, a determination can be made that the associated form element remains blank. For example, a signature field must be signed prior to finalizing the document package for providing to the other party. If no signature has been entered, completeness logic can identify the field and send a notification to at least one user, such as the real estate agent or client.

In one embodiment, completeness logic can be used to create status indicators that indicate unfinished elements, such as empty form elements within one or more documents. For example, the status indicators can indicate that some fields in a required document have not yet been filled in. The indicators can appear as a pop-up message or other type of notification while the user is working on the document in which a completeness error is identified, when the user leaves the document with the completeness error, or during checking of the document package. Ensuring that a document package is complete by including all necessary documents for a transaction and that all form elements within the documents of the package are filled in helps limit interactions with parties to or stakeholders of a transaction before information in the document package is complete. For instance, the system can prevent a document package from being sent to another party to the transaction for signatures before required information is filled in, which can prevent multiple rounds of back and forth communication between the parties to fix the error and result in completing the transaction in less time.

Figure 13A:
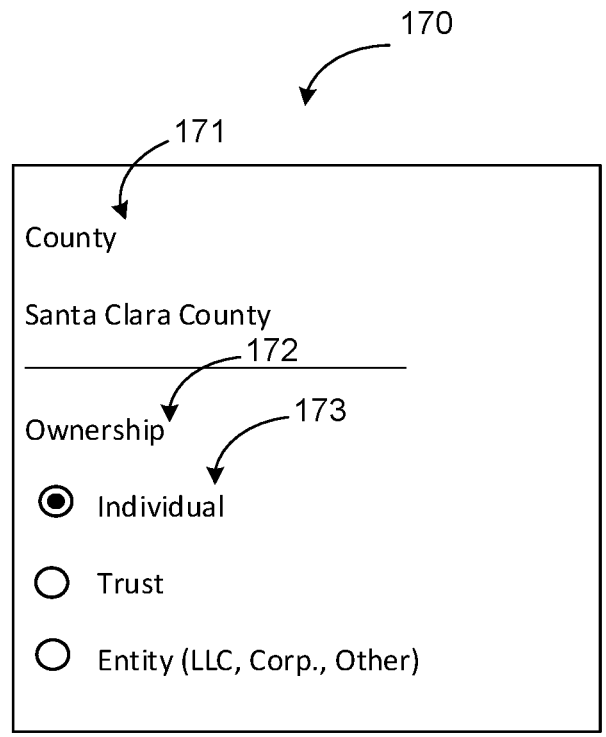
FIG. 13A is a diagram of an interactive form showing, by way of example, a portion of the cover sheet of FIG. 8.

Completeness logic can also be used to identify form elements to be added to a document depending on data values that are filled in for other form elements in documents included in the package. FIG. 13A is a diagram of an interactive form showing, by way of example, a portion of the cover sheet 170 of FIG. 8. The cover sheet 170 can include form elements for identifying a county 171 in which a property is located and the type of ownership 172 of the property, including individual, trust, and entity. In this example, the property is owned by an individual and the individual's name, which can be provided under the seller's name form element as described above with reference to FIG. 8, can be used to populate form elements associated with identifiers for the owner's name or identity.

Figure 13B:
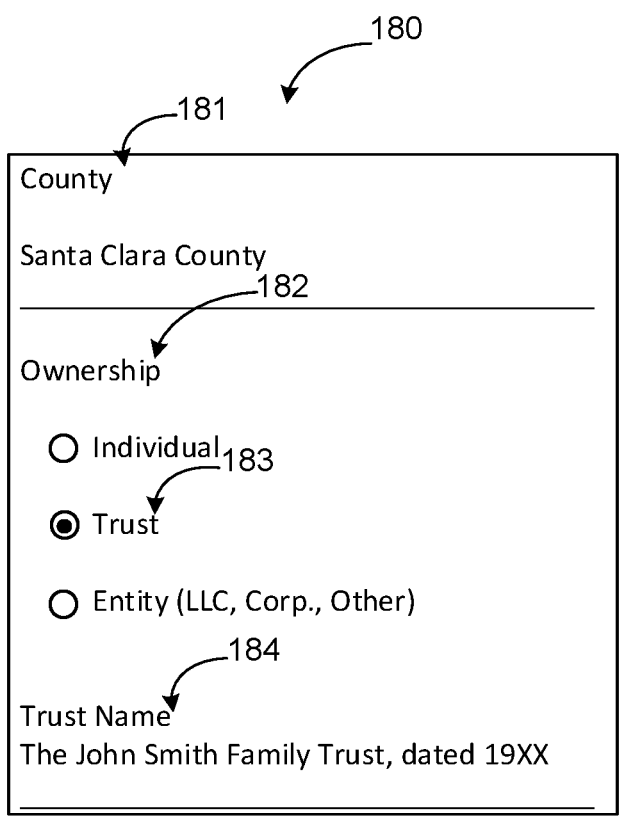
FIG. 13B is a diagram of an interactive form showing, by way of example, the portion of the cover sheet of FIG. 13A with a different data value.

However, additional information may be required based on a data value entered by a user. For example, if information is added indicating that a property has a swimming pool, additional forms may be required. The completeness logic can be performed to request the additional information. FIG. 13B is a diagram of an interactive form showing, by way of example, the portion of the cover sheet 180 of FIG. 13A with a different data value. The cover sheet 180 can include form elements for identifying a county 181 in which a property is located and the type of ownership 182 of the property, including individual, trust, and entity. In this example, a trust 183 owns the property, which is the subject of the transaction. However, additional information about the trust is necessary to complete the documents in the package because the previous form elements did not include a request for trust name. The completeness logic identifies the trust selection 183 and displays an additional field 184 for a name of the trust.

Prior to, during, or after application of the completeness logic, consistency logic can be performed to ensure that related form elements in the documents in a document package are filled in in a semantically-consistent manner. FIG. 14 is a diagram of a document template 190 with form elements 191, 192 for property price. The document 190 includes form elements for two different representations 191, 192 of the sales price for a property. In one field 191, the price data value 191 should be spelled out in words, as is common practice for paper bank checks. The other form element 192 requires the price to be entered with a currency indicator, such as a dollar sign followed by a number. The consistency logic for checking syntax can refer to the data field indicator "Prop.Sales.Price.Num," which is associated with the form element 192 for sales price number and the data field identifier "Prop.Sales.Price.Str" for the sales price string of words. Based on the similarity of the identifiers, including the common portion "Prop.Sales.Price," the data value of the spelled-out field could be checked for consistency against the numeric sales price via the consistency logic.

In a further embodiment, the consistency logic together with a data entry system could derive a string representation of the sales price consistently and automatically after the numeric representation of the price is entered. The consistency logic can also identify and input the numeric representation of the sales price after a string representation of the sales price. Other form elements that can benefit from a consistency check include ensuring that the property address in numbers matches with a spelled-out version of the property number.

In addition to performing consistency logic on the document package, correctness logic can also be performed to ensure that data values populating the form element are verified by authoritative sources. Specifically, the correctness logic can identify invalid data values and provide suggestions for data values via an authoritative source, as described above with respect to FIGS. 8, 13A, and 13B. For instance, the correctness logic can identify invalid email addresses, such as those without the ampersand symbol or a domain. Additionally, the correctness logic can connect to a multiple listing service or regional database that stores addresses and utilize those addresses to provide suggestions for partial data values entered by a user for an address. Other examples of form elements on which the correctness logic can be applied include zip code and state, and street address and city, as well as many other form elements. The correctness that a particular zip code is located within a particular state can be verified by a mapping database or property records database.

Also, the data values can be checked using compliance logic, which helps ensure that the documents in the package comply with all regulatory requirements. The compliance logic can access and use one or more authoritative sources to look up a required set of documents based on the address of the property being sold. In one example, the regulatory information is entered into the compliance system by real estate subject matter experts using a Transaction Coordinator Platform. The human experts consult appropriate governmental and other sources, create document templates, and assign the templates to the proper geographic region. The document templates can be generated from documents prepared by different organizations, such as regional real estate associations and groups. Additionally, online government sources can be used to obtain information.

Finally, confirmation logic can be applied to the document package prior to sending the completed document package to the other party. The confirmation logic ensures that all of the required signing and dating of the documents are completed. A notification can be provided to the user to identify any blank fields that should have a signature or date. The notification can be provided by a pop-up notification or by highlighting the blank field. Once the document package has been populated and checked, and no errors exist, the package can be provided to the other party.

Managing Public Real Estate Transaction Information

Documentation of the real estate transaction is important to properly record in order to protect the rights of people to own and use particular parcels of land and land-related resources. However, the transparency and accountability of documentation is subject to several obstacles. Generally, the documentation of a real estate transaction includes the chain of title transaction records, tax records, records of easements, records of liens, inspection reports, and other documents mandated for compliance requirements. Although buyers and sellers may have their own copies of records, their copies can be lost, discarded, damaged or destroyed over time. Property owners rely on other institutions to maintain backup or master copies of various documents.

In traditional systems, a large set of stakeholders provide and keep copies of separate and distinct parts of the required documentation. The stakeholder institutions include county offices, lenders, title insurance companies, property inspectors, research reporting organizations, and others. The parties to a transaction and the real estate brokerage may also keep copies.

A difficulty with this approach is that if a challenge arises later about a transaction, gathering the official records of the transaction may require getting documents from many institutions and is extremely time consuming. If discrepancies arise between versions of the records, the forensic methods for assessing fault and tampering are hampered because few of the institutions employ technology that is well-protected by computational security safeguards and adequate redundancy. Furthermore, the institutions themselves may have been replaced, gone out of business, or changed their record keeping systems. The institutional records are subject to failure in long-term document storage since traditional paper-based records are subject to the usual hazards of being damaged, misplaced, or lost over time.

Additionally, digital records are also subject to loss over time and to media failure, while legacy databases can potentially become obsolete as new generations of computers and databases are deployed. Further, errors in transaction documents can be introduced as institutions update their legacy computer systems and migrate records from legacy systems to new ones. Institutional effort in maintaining quality records depends on the available funds, skills, and vigilance of the institutions to maintain records going back through generations of previous computer systems and institutions.

Blockchain for Real Estate Transactions

Such obstacles of recording can be overcome by bringing together all the important records of a real estate transaction and recording the records in an accountability blockchain ledger with a timestamp so that all of the documents for a transaction are available at once in a single block on a blockchain. A traditional blockchain approach is not sufficient for managing real estate transaction documents, but a compliance and accountability blockchain approach provides document generation, compliance, and secure storage for real estate transactions using a centralized or decentralized approach for public access of the stored documents, as well as a one- or two-tier approach for storing and replicating document records. Hereinafter, the phrases "compliance and accountability blockchain approach" and "accountability blockchain approach" are used interchangeably with the same intended meaning, unless otherwise indicated.

Figure 15:
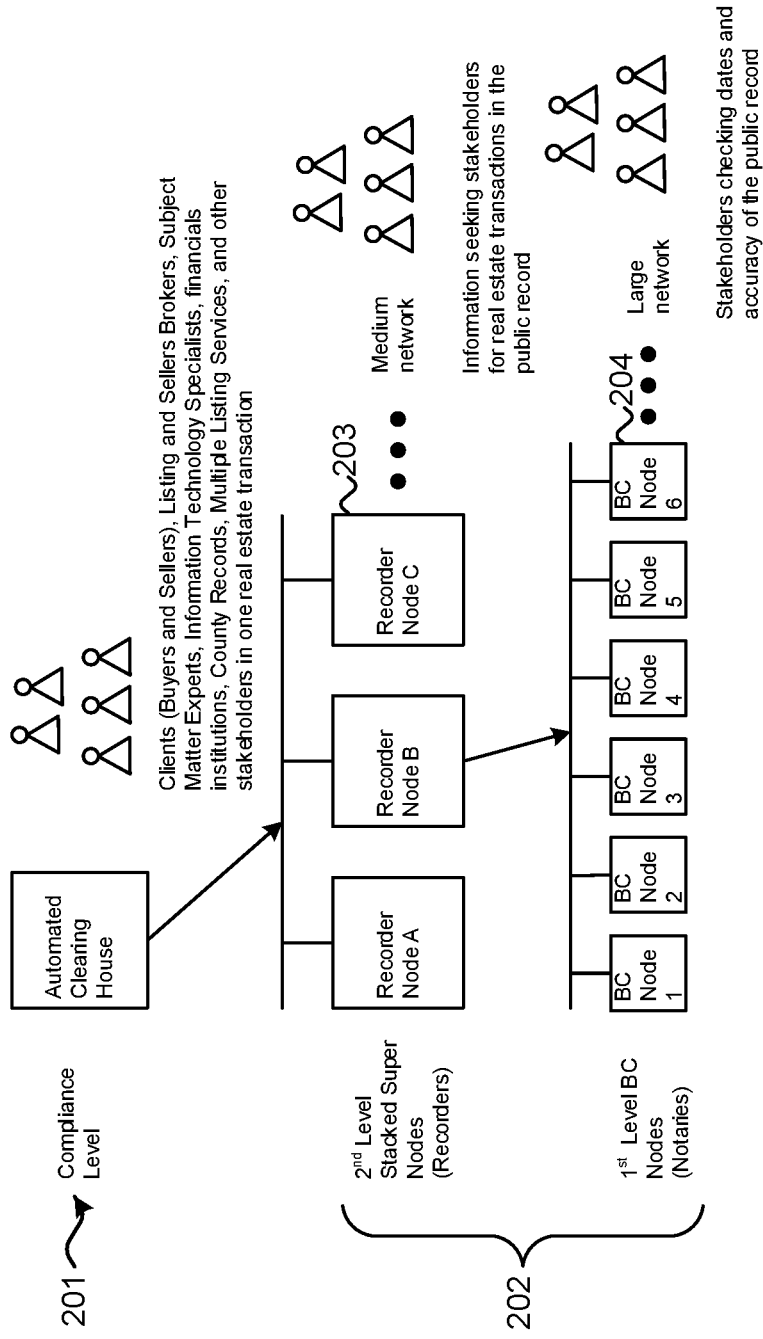
FIG. 15 is a block diagram showing a system for document transformation and accountability.
Figure 16:
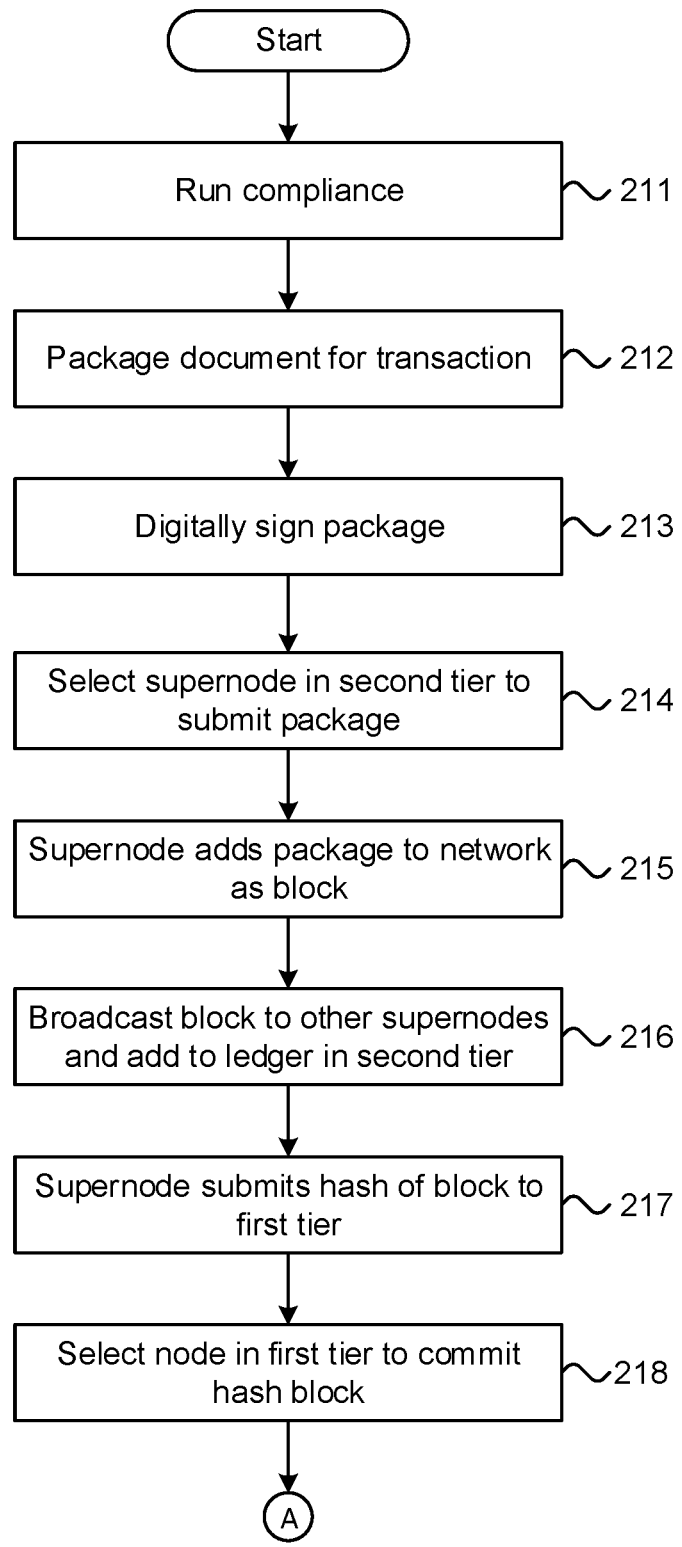
FIG. 16 is a flow diagram showing a method for document transformation and accountability via blockchain.
Figure 17:
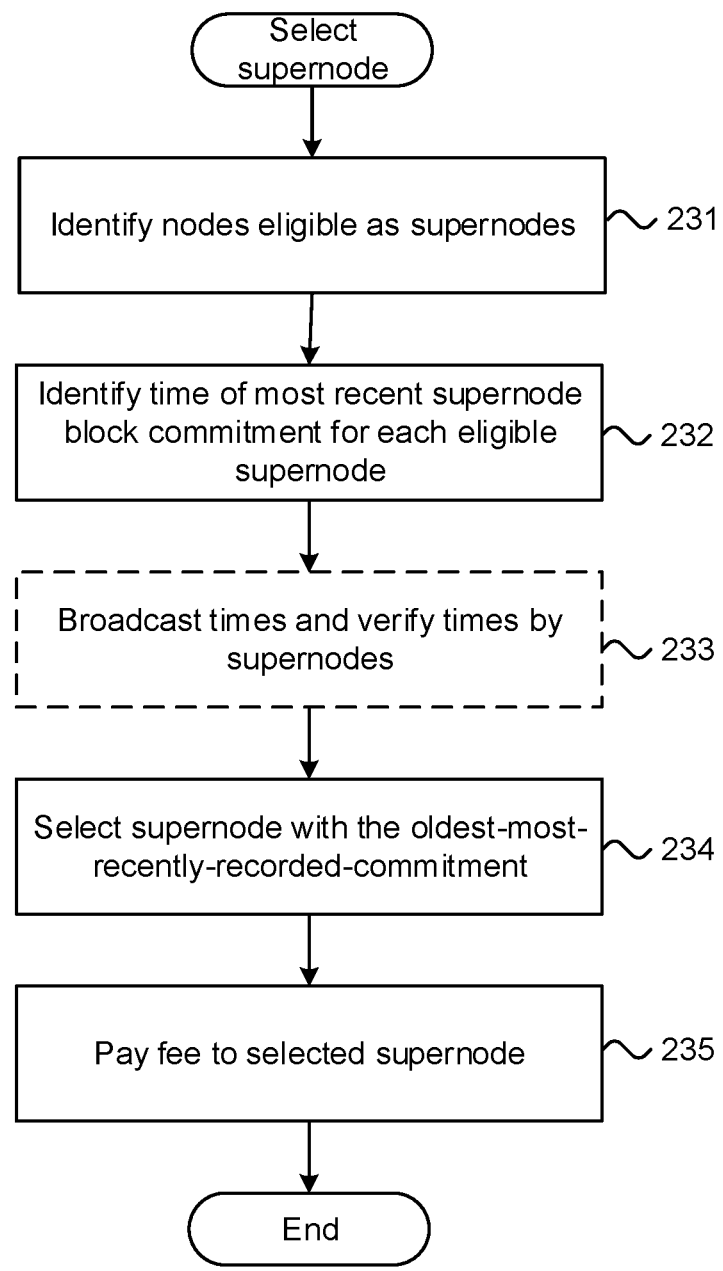
FIG. 17 is a flow diagram showing, by way of example, a process for selecting a supernode for block recordation.

The documents provided to the accountability blockchain can be publicly accessible as described below with respect to FIGS. 15-17, in commonly-owned U.S. patent application Ser. No. , titled "Blockchain-Based System and Method for Document Transformation and Accountability, filed Sep. 4, 2019, and in commonly-owned U.S. patent application Ser. No. , titled "Multi-Tier Blockchain-Based System and Method for Document Transformation and Accountability," filed Sep. 4, 2019, the application disclosures of which are hereby incorporated by reference, or remain confidential with access only to the parties of the property transaction, unless otherwise approved, as described in commonly-owned U.S. patent application Ser. No. , titled "Blockchain-Based System and Method for Listing Document Transformation and Accountability," filed Sep. 4, 2019, and U.S. patent application Ser. No. , titled "Blockchain-Based System and Method for Purchase Document Transformation and Accountability," filed Sep. 4, 2019, the disclosures of which are hereby incorporated by reference. The accountability blockchain is a continuously growing set of records or "blocks" forming a ledger of transactions. The blocks are linked and secured by cryptographic methods. Each block includes the data of a real estate transaction together with a timestamp and a cryptographic hash of the previous block.

The accountability blockchain is managed by a peer-to-peer network where nodes, such as an electronic device, adhere to a protocol for inter-node communication and for validating new blocks. Once recorded, the data in any given block cannot easily be altered retroactively without altering all of the subsequent blocks. Such alteration is difficult due to requiring consensus of the network majority. The accountability blockchain approach allows participants to verify and audit transactions. In this way the blockchain resists modification of the data maintained. The blockchain can be multi-tier and utilize supernodes that act as recorders.

In addition to obstacles regarding maintaining transaction document, another concern is that the documents may not be genuine, such as not authorized by the required authority or exact same versions of the formal documents signed for the transaction. To ensure that all transaction documents are authentic, each document can be digitally signed by the authorizing parties and a record of the collection of documents for the transaction is also digitally signed. The digitally signed documents helps ensure that the saved transaction documents are authenticated and are the exact versions used in the transaction.

Once stored, there is a potential of deliberate alteration of the transaction records by parties that are motivated to change the historical record. For conventional paper public documents, when master copies are made available for public inspection, there is always the risk that they might be removed, damaged, altered, or replaced by altered versions. Digital records are also potentially subject to alteration and deletion depending on the security measures that are in place. They are particularly at risk when the security teams of institutions with low budgets are not skilled in security practices and technologies.

To ensure that transaction documents are secure and free from alterations and modifications, the accountability blockchain approach is deployed to preserve the public record, including strong computational security provisions, and to protect records against destruction or tampering. The blockchain approach tailored to support real estate transactions and provides an open and distributed ledger for recording the data of real estate transactions between parties in a verifiable and permanent way.

An additional concern regarding maintaining transaction document is that an individual repository of digital information is subject to catastrophic failure, either by natural disaster, media failure, or deliberate damage by a motivated party. However, the accountability blockchain approach is decentralized and distributed across many computers. Peer-to-peer networks have no central point of failure. When nodes validate transactions, they broadcast the completed transaction documents to other nodes. Every node in the network has its own copy of the blockchain, resulting in massive database redundancy. The massive redundancy of the network assures that any damage to a single node does not prevent access to the public records on the blockchain. In this way, the cryptographic mechanisms and high redundancy of blockchain ledgers provide forensically-inspectable records and high barriers to tampering that do not rely on the security provisions of any individual institution.

Storing Large Transactions on Blockchain

Digital transaction systems need to operate correctly even across international boundaries and under different legal systems and regulatory rules to ensure that the transaction documents are available to be accessed anywhere and to ensure that the records are complete. Further, there is no central all-region legal authority to hold independent international systems accountable. To ensure proper functioning of the transaction system, the accountability blockchain approach provides a computational basis for establishing trust. The nodes (operated by "miners") gather the records for a transaction to create a new block in competition with one another. In general, selecting the creator of a next block to be distributed across the network to avoid centralization would discourage the stable continuance of a large distributed network.

The accountability blockchain approach briefly described above for securely maintaining real estate transaction documents and generating an active record of the documents is not merely the use of a current blockchain implementation and generation of the accountability blockchain required many obstacles to be overcome. Conventionally, most blockchain implementations, such as Bitcoin, were designed to record anonymous financial transactions and to keep node costs down and to encourage many organizations to add nodes to the network, the system requirements for nodes require only a minimum of storage for saving transaction data. For example, in 2017, saving the entire Bitcoin ledger required only 125 gigabytes of free disk space and the amount of storage of content data per transaction in this network is about 40 bytes. See Peck, Morgen E. & Moore, Samuel K. Special Report: Blockchain World. IEEE Spectrum, October 2017. Also, as of January 2017, there were approximately 6000 bitcoin nodes in that digital currency network. See Connel, Justin. How Much Does it Cost to run a Full Bitcoin Node? News Bitcoin.com, Feb. 23, 2017. The health of the network depends on having many blockchain nodes, preferably at least thousands of nodes.

In designing new generations of blockchain systems for real estate transaction and other applications beyond the original application of digital cash, there is a competing need to store and make accessible large blocks of data on the network over the long term. The accountability blockchain approach balances the requirement for a large pool of low-cost nodes to robustly record the consensus of transactions with the requirement that nodes have substantial storage and computational costs. Thus, one embodiment of the accountability blockchain employs a network with two layers of nodes to reconcile these requirements. For example, the accountability blockchain approach can include a medium-sized network of supernodes (e.g. hundreds to thousands of nodes) that bundle the real estate transaction package and robust, transparent and enduring storage and can also include a larger network of $1^{st}$-tier nodes (e.g. tens of thousands or larger nodes) for notarizing hashes of the $2^{nd}$-tier transactions.

Recording transactions in a distributed ledger of the blockchain has less value if the information cannot be reliably, efficiently, and accurately retrieved. As the number of documents grows, the challenges and resources increase for maintaining robust storage and efficient retrieval of them all. A design concern is that the expense of storing so much data could over time create an obstacle to wide participation by supernodes on the block chain. In conventional blockchain systems for currency, the ongoing storage costs are relatively low. The costs of maintaining long-term are offset when nodes win enough commitment races such as is expected by proof-of-work protocols.

An accountability blockchain approach allows subsets of supernodes under contract to store only subsets of the documents. For example, some supernodes could select which transactions to store based on location or value or some other content-related criterion. In other alternatives, every $n^{th}$ transaction can be stored and there could be an allocation scheme that limits the number of nodes on the network that are licensed to store only subsets of the transactions. In that way, supernodes could specialize in markets, storing specific categories of documents they store.

A known potential risk in conventional decentralized server networks for storing files is that some of the servers could cheat by not actually keeping copies of the files. Instead, when they receive a retrieval request, they make a retrieval request to other nodes on the distributed storage network. The problem with such selfish behavior is that document storage on the network becomes less redundant and robust. Various "proof-of-storage" technical approaches have been proposed to enable catching server nodes that cheat Cecchetti, Ethan, Miers, Ian, Juels, Ari. One file for the Price of Three: Catching Cheating Servers in Decentralized Storage Networks. Hacking Distributed blog, Aug. 6, 2018 and van Dijk, Marten, Rivest, R. L., Juels, Ari, Stefanov, Emil, Operea, Alina, Triandopoulos, Nikos. Hourglass Schemes: How to Prove that Cloud Files are Encrypted. CCS'12 (ACM Conference on Computer Security), 2012.

The compliance and accountability blockchain approach provides document generation, compliance, and secure storage using a centralized or decentralized approach for public access of the stored documents, as well as a one- or two-tier approach for storing and replicating document records. Hereinafter, the phrases "compliance and accountability blockchain approach" and "accountability blockchain approach" are used interchangeably with the same intended meaning, unless otherwise indicated. Such an approach includes verification protocols that raise the costs of cheating. The methods are similar to proof-of-work ideas in that they create complexity challenges in storage and retrieval that raise the costs of serving up the documents on request. The extra complexity of the approach is offset at least in part by relaxing the requirement that all supernodes store all of the data.

As briefly discussed above, the idea is to admit classes of contracts and servers that agree to store only portions of the entire ledger for specified periods of time. The expectation of long-term storage and retrieval would fail under conditions when storage and retrieval reimbursements are fixed, the cost of ongoing storage become too high and there is a fixed penalty for a node to stop providing the service. Furthermore, if the only remuneration for long-term storage is given up front when the block is committed, there can be a lack of incentives for new supernodes to join the network over time.

An inherent problem with "forever" guarantees covering perpetual file storage and retrieval is that that the costs of reliable storage and retrieval for any particular file accumulate over time whereas the value of most documents decreases with time. Whenever the network fails to retrieve documents from the ledger, there is potentially a loss of reputation and goodwill for the network. This loss reflects on the entire network since the network as a whole may at times stop storing some of the documents.

In practice, supernodes could have time-delimited commitment contracts for guaranteed reliable storage and retrieval of the documents subject to loss of stake on failure to keep the contract. This limits the long term contractual and financial risks for supernodes. However, a difficulty with relying solely on time-limited contracts and fixed fees to maintain a viable set of supernodes is that the future costs of storage, retrieval and communication are not perfectly known. As costs go up and down, new supernodes that can take advantage of changes in costs to out-compete older supernodes operating on fixed contracts. Judging from the history of property ownership records in history, it is likely that rapid access to most records of transactions older than a few hundred years would have limited value.

The accountability blockchain approach could also include a document storage and retrieval market with ongoing incentives for document storage and retrieval. Such a market can allow variable fees for retrieving scarce or otherwise expensive documents, based on such factors as the age of the transaction, the location of the property, and so on. In addition, the approach could use an auction to adjust the cost of retrieval to vary with the value of the service. These variations in the different embodiments enable trade-offs between the costs of storage, retrieval efficiency, and the public's good for having low-cost access to the information.

Multi-Tier Blockchain

In summary, the design challenge of the accountability blockchain approach for real estate is to balance the requirement of large storage capacity on nodes with the requirement for enabling a large pool of low-cost nodes to robustly record the consensus of transactions. To ensure scalability and liveliness, the accountability blockchain approach includes a multi-tier system. Scalability refers to the capacity to operate at a larger scale, such as a large number of real estate transactions, while liveliness refers to operating at a quickly enough for large scale data across many nodes. FIG. 15 is a block diagram showing a system 200 for document transformation and accountability. The system 200 includes a compliance information management system 201, and a multi-tier blockchain. The compliance information management system 201 is described above in detail with respect to FIG. 2 and is a client and stakeholder-facing platform that is responsible for generating and transforming documents for a real estate transaction, as well as ensuring that the documents are in compliance with local and federal regulations, are correctly populated, and are complete. The compliance information management system 201 is concerned with one real estate transaction at a time.

Once a transaction is complete, the transaction, including the documents, is stored on the multi-tier blockchain, which is responsible for maintaining a long-term data base of real estate transactions. In one embodiment, the multi-tier blockchain can include two tiers, with second tier supernodes 203 that act as recorders of the transaction and first level nodes that act as notaries. The nodes can be electronic devices, including computers, phones, or other computing device, with an IP address and a connection to the Internet. In one embodiment, the second tier can include hundreds to thousands of supernodes, while the first tier can include more nodes than the first tier, such as tens of thousands of nodes. However, other numbers of nodes and supernodes are possible and typically larger numbers are preferred.

The second tier holds the tamperproof public records and makes the appropriate information available to the public. The second tier supernodes 203 are similar to the country recorder offices in real estate, and validate and store the large document package for the transaction, including the executed contract, the chain of title, and the funding of escrow. The document package can be the same package generated by the compliance system, including those added via the compliance system, such as a copy of the property deed. In a further embodiment, the documents can be different, including a subset of the documents in the package from the compliance system. For example, the subsets can be generated by separating all documents for public access and not for public access.

The second tier nodes bundle up and sign the package of information, computer a hash of the information package, and provide an accessible public record of the document package. The supernodes 203 allow stakeholders to seek information regarding real estate transactions in the public record. The first tier includes nodes 204 to provide a vastly redundant record of all transactions, while performing and distributed and tamperproof notary service that improves the security and tamper-resistance of the second tier. The nodes 204 of the first tier act as notaries and allow stakeholders to check dates and accuracy of the public record. The stakeholders can include owners of the property, as well as institutions, such as county offices, lenders, title insurance companies, property inspectors, research reporting organizations, and others.

Each of the nodes 204 in the first tier and the supernodes 203 in the second tier can maintain a ledger, which is a record of the transactions stored as blocks on the blockchain, that is available to the public. For instance, the blocks of each transaction form the ledger. When each of the nodes and supernodes has a copy of the ledger, alteration of the record is much more difficult. However, in a further embodiment, less than all the nodes and supernodes can be associated with a ledger.

The document packages for transfer of real property are recorded as blocks on the blockchain after at least one of the documents have been generated and reviewed for compliance, as described above with respect to FIGS. 1-14. FIG. 16 is a flow diagram showing a method 210 for document transformation and accountability via blockchain. One or more documents, such as the real estate sale and purchase agreement, are processed (block 211) for transfer of a property through the compliance system, described above with respect to FIG. 2, and a document package is generated (block 212) for the real estate transaction. The document package can include the executed contract for the real estate transaction, a chain of title for the property of the transaction, and a record of the property funding.

The document package is then digitally signed (block 213) by the parties to the transaction. Additionally, all conditions of the agreement must be satisfied, including payment of an earnest money deposit by the buyer. In one example, the deposit can be three percent of the agreement upon price of the property; however, other deposit amounts are possible. Once all conditions of the executed contact have been satisfied, such as the packing signing and payment of earnest money, the document package is submitted to the second-tier network of the accountability blockchain. Other conditions that must be satisfied prior to providing the document package to the blockchain are possible.

Prior to entering the second tier of the accountability blockchain, one of the supernodes is selected (block 214) for adding the document package as a block to the second-tier network. Selecting the supernode is further described in detail below with respect to FIG. 17. The block is also broadcast (block 215) to the other supernodes and added (block 216) to the blockchain ledgers maintained by the supernodes at the second tier with a timestamp. In one embodiment, each supernode can store a copy of the entire ledger for at least a predetermined amount of time. In a further embodiment, subsets of the supernodes can each store only a subset of the ledger. Further still, supernodes may be specialized and store only a particular type of data, such as transactions occurring in Washington or in California. Other methods for storing copies of the ledger are possible.

The selected supernode submits (block 217) a request for notarization of the block to a first-tier node selected for recordation, as well as an immutable summary record, such as a cryptographic hash, of the transaction documents of the block that have been validated by the supernode. At a minimum the immutable summary record of the block is that if the documents are changed, the record is recomputed and the new record will differ from the original. A further property for the immutable summary record includes difficulty to make a change or a series of changes to the document, such that the record for the changed document is the same as the record of the original document.

The request for notarization can be provided by the selected supernode prior to or after committing the block to the second tier network. The first-tier nodes compete to be selected to commit the hashed block to the first tier and the selected node is paid a transaction fee. Also, the selected node provides the hashed block to the other nodes in the first tier for committing (block 219) to the blockchain of each node. Specifically, the hash of the transaction is committed as a record. Accordingly, each node acts as a notary of the network and provides a robust, broadly decentralized record of the transaction. Since multiple nodes keep a record of the transactions the record is difficult to alter. Also, since the transactions are each stored as a block in a chain of blocks, altering data further in the chain is extremely difficult without altering all of the subsequent blocks. The document package can then be accessed by the public for viewing, such as via a computer.

When a document package first enters the accountability blockchain, selecting the supernode for committing the block to the second tier is important to prevent any one supernode from having a central and dominant role. In one embodiment, the supernode with the least-recent-block-recording can be selected. FIG. 17 is a flow diagram showing, by way of example, a process 230 for selecting a supernode for block recordation. First, those nodes that qualify as supernodes are identified (block 231). In a proof-of-stake approach, a minimum stake is predetermined to identify a set of nodes that qualify as supernodes. In one embodiment, the stake can be a dollar amount, such as $100,000. However, other dollar amounts are possible. In a further embodiment, the dollar amount can change in a periodic auction to assure a robust, but not too large set of supernodes. The staking minimum is held as a security deposit and is lost to the network if a user tampers with the factuality of a transaction.

A time of the most recent supernode block commitment can be computed (block 232) by each supernode from the blockchain itself. Specifically, a time that each supernode most recently committed a block to the second tier is determined for each supernode. Optionally, the times can be broadcast (block 233) from each supernode to each other supernode for verification. In one embodiment, maintaining the times on the ledger should be immutable. Subsequently, one of the supernodes with the oldest-most-recently-recorded-commitment is selected (block 234) to lead the commitment of the current document package as a block in the second tier. However, the supernodes must reach consensus regarding selecting the supernode with the oldest-most-recently-recorded-commitment. In one embodiment, a short time period is designated during which each member of available supernodes participates in a consensus vote to identify the least recent recorder. To determine availability, the supernodes broadcast notices of availability at a frequent interval, such as in time with heartbeats per second, and are considered fresh if the notices of availability are no older than a longer interval, such as ten seconds. However, other times for the notice intervals and for determining freshness of the notices are possible. Supernodes may be unavailable, such as when undergoing maintenance or are busy. Finally, all of the supernodes broadcast their inferred determination of the next node according to the recency rules.

Once selected, the supernode can receive (block 235) a fee for leading the commitment of the current block. In a further embodiment, all the supernodes can receive a fee. Once the current block is recorded, the recording recency of the selected supernode is updated to the current time and that node cannot be selected again until the current transaction is older than the most recent transactions of all the other available supernodes. Consensus regarding recency of recordation can be confirmed when all supernodes maintain complete logs of a transaction. However, if the logs are not complete, consensus can be reached using a certain percentage of the supernodes, such as two-thirds, that agree on the supernode with oldest-most-recently-recorded-commitment. If such percentage is met, consensus is reached and that supernode is selected. For example, the Byzantine Fault Tolerant can be used to determine consensus. After consensus is reached, all of the supernodes validate the block signature representing an owner of the supernode, and cryptographic hash and add the block to the second tier blockchain.

Other methods for selecting the supernode for commitment of the block are possible. In a proof-of-work approach, the first node to solve a cryptographic puzzle and present a valid block to be committed, is the node that gets selected to record the new block and paid for the service. A node trying to add a new block must provide a cryptographic proof-of-work along with it. Different kinds of proof of work can be used, such as such as a hash function, integer factorization, or guided tour puzzle protocol. One approach is for nodes to solve the challenge of computing a specified kind fixed-length hash of the data where the first part of the hash is a string of zeroes of given length. If more than one miner finds a solution, the one with the earliest timestamp is selected.

A proof-of-work-with-stake allows those supernodes that have a minimum large stake to be eligible. A first eligible supernode to complete a proof-of work commits the block and receives the fee. The proof-of-work can include a mathematical puzzle, such as a hash function, integer factorization, or guided tour puzzle protocol. The puzzle should be difficult, but not so time-consuming as to prevent a delay in committing the block. Generally, there is no time limit to complete the puzzle and report proof-of-work and thus, can be subject to potential collusion by selfish miners. To prevent such problem from occurring, selfish mining can be prohibited by pools that command less than one fourth of the resources, such as in selfish mining.

Another embodiment for selecting a supernode and reaching consensus includes a combination of proof-of-work and least-recently-recorded transaction. The first node to complete the proof-of-work is selected unless that supernode added the most recent block to the network. In that case, the next supernode to complete the proof of work within a predetermined time is selected.

Deterministic random distribution can also be used to determine consensus of a supernode selection and provides a known uniform random number generator that is used by all of the supernodes in the second-tier pool of supernodes that meet the minimum large stake. The seed of the random number generator is a subset of the digits of the hash of the previously recorded transaction documents, scaled to the size of the pool. The produced random number is used as the index of the supernode in the list of supernodes sorted by their IP addresses. If the designated supernode has not produced the next record within a time interval, the process repeats. Other methods for reaching consensus are also possible.

Additionally, other configurations of the accountability blockchain approach are possible. For instance, rather than a network of second tier supernodes, a set of second supernodes can exist. Any one of the supernodes in the set can bundle the transaction for submission to the first-tier network for notarizing.

In a further embodiment, a single homogenous network of supernodes that commit real estate document packages to storage on a distributed storage network, such as a blockchain. All of the nodes provide enough storage for document packages and use a blockchain approach for distributed and decentralized storage and accountability of the information and a separate first-tier network is not needed because the supernodes will notarize the packages.

Single-Tier Blockchain

In still a further embodiment, a single-tier blockchain can be used. Enabling a single-tier blockchain to record real estate transactions requires significant innovation to overcome existing challenges, such as the large amounts of storage required to record such transactions. Currently, a package of documents for a real estate transaction, including one or more of a deed, mortgage, easement, judgment, lien, foreclosure, or request for notice of default, are recorded with a governmental entity that is jurisdictionally located. Recordation of such documents for each transaction require extremely large amounts of storage space and undo expense and processing when there are potentially very large numbers of nodes. Accordingly, a transaction recordation system with comprehensive access, tamperproof guarantees and validity checks, and robust archiving for all of the historic records in property transactions is needed.

Figure 18:
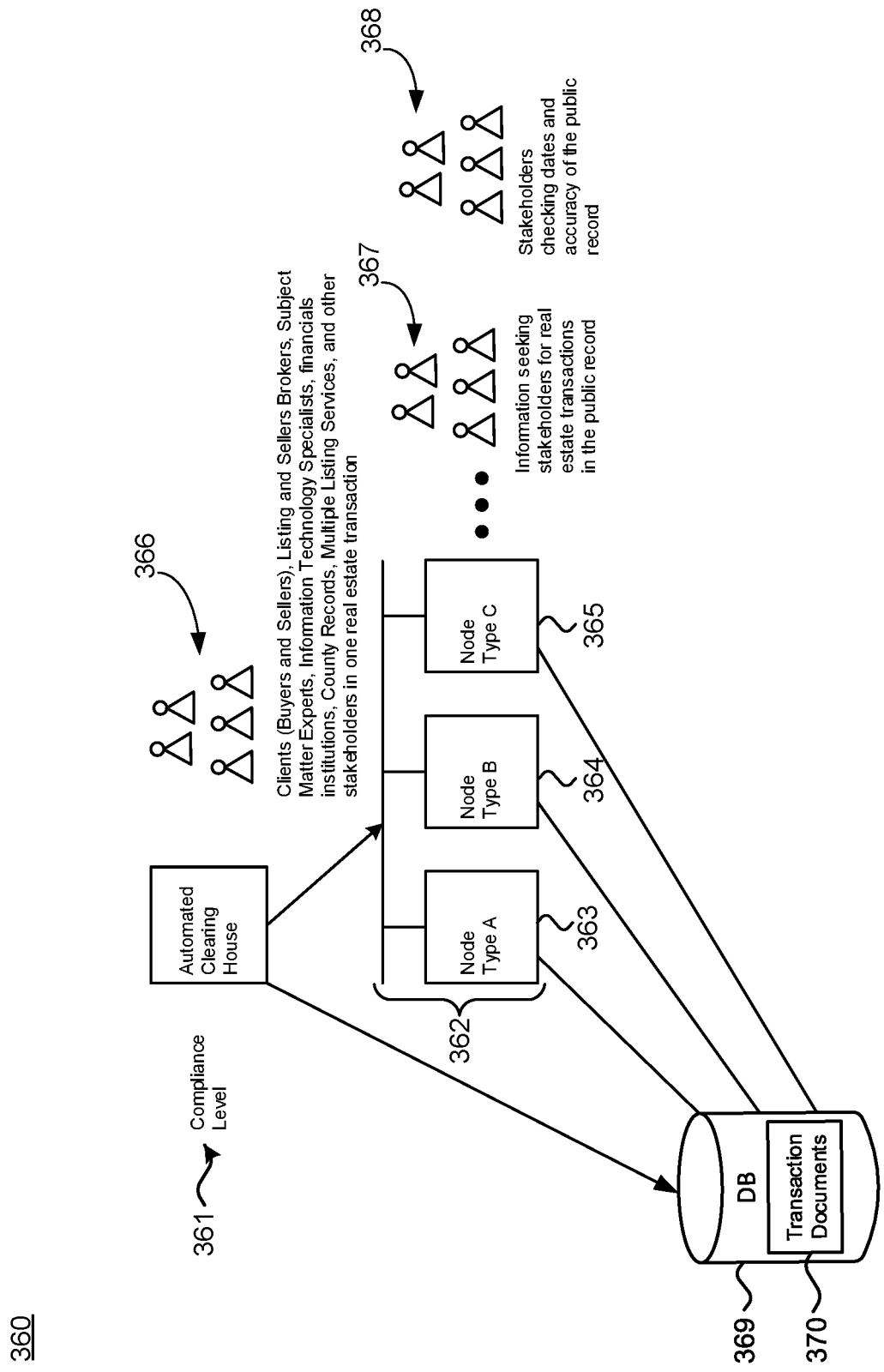
FIG. 18 is a block diagram showing, by way of example, a single-tier system for document transformation and accountability.

Utilizing a single-tier blockchain for recording real estate transactions requires large amounts of storage, which can be located within the blockchain or separate from the blockchain. FIG. 18 is a block diagram showing, by way of example, a different embodiment of a system 360 for document transformation and accountability. The system 360 includes a compliance information management system 361 and a single-tier blockchain 362. The compliance information management system 361 is described above in detail with respect to FIG. 2 and is a client and stakeholder-facing platform responsible for generating and transforming documents for a real estate transaction, as well as ensuring that the documents are in compliance with local and federal regulations, are correctly populated, and are complete.

Once a transaction is complete, a record of the transaction is stored on the single-tier 362 blockchain. Specifically, the single-tier 362 can include a plurality of nodes 363-365 that each record the transaction, using a hash of the transaction documents, on a copy of the blockchain maintained by that node. The nodes can store the same type of information or different information regarding the real estate transaction. For example, a first type of node 363 can store only a cryptographic hash of the transaction documents as a record of the real estate transaction, while a second type of node 364 can store a hash of the transaction documents and a copy of the transaction documents themselves and a third type of node 365 can store a hash of the transaction documents and chain of title information for the real estate transaction. Thus, the single-tier can include one or more types of nodes and other types of nodes are possible. The different types of nodes are further discussed below with respect to FIG. 19.

When the tier includes nodes that store a cryptographic hash of the transaction documents only and/or nodes that store a hash of the transaction documents with the chain of title information, and not nodes that store the actual transaction documents, a storage 369, such as database or centralized server, that is separate from the blockchain 362 can be used to store the transaction documents. However, if the nodes that store the hash of the transaction documents and the transaction documents themselves are included in the tier, the transaction documents can be maintained on the blockchain.

Figure 19:
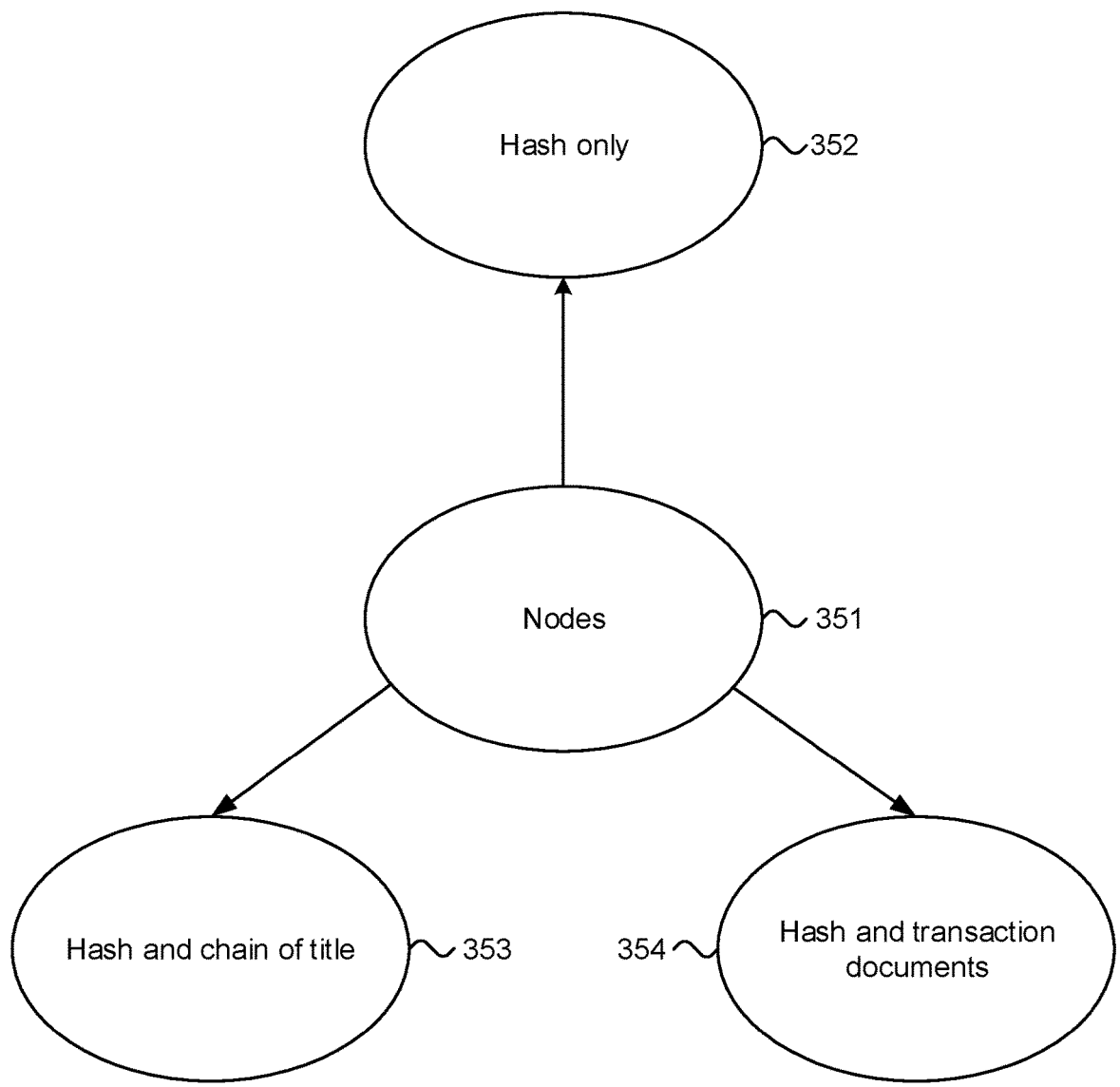
FIG. 19 is a block diagram showing, by way of example, different approaches for storing data associated with a real estate transaction.

Allowing the use of different types of nodes in a single-tier can reduce the amount of storage required by many nodes in the tier, allowing large numbers of real estate transactions to be recorded. FIG. 19 is a block diagram showing, by way of example, different approaches 350 for storing data associated with a real estate transaction. The single-tier of nodes can includes the same type of nodes or different types of nodes. When different, the nodes can differ based on a type of data stored with respect to the transaction as discussed below.

Record Cryptographic Hash

A single-tier of nodes 351 can include the same or different types of nodes based on the types of data stored by each node. In one embodiment, the nodes can be the same and each node can record a hash 352 of the transaction documents to maintain a listing of transactions or a chain of title. Recording a cryptographic hash of the transaction documents reduces the amount of storage required by each node, while still being capable of preventing fraud since changes to the documents would alter the hash and would be detectable. The transaction documents can then be stored on a different set of nodes that are not part of the blockchain or can be stored on a different type of node that is included in the blockchain as described below.

Record Cryptographic Hash and Transaction Documents

Alternatively, the tier of nodes 351 can include different types of nodes. In one embodiment, the single-tier can include nodes that record the hash only and other nodes that record the hash 354 along with the transaction documents that were hashed. The nodes that store the hash and the transaction documents require much more storage than those nodes that record only the hashes. Using different types of nodes allows nodes with less storage to participate, while requiring only some nodes to have large amounts of storage to maintain copies of the transaction documents. Nodes that are able to store the transaction documents can also check compliance of those documents upon access, which is described in detail above. Additionally, in one embodiment, the nodes can carry the hash on the blockchain forever, but storage of the actual transaction documents may likely be deleted after some time to allow more storage space.

Record Cryptographic Hash and Chain of Title Data

A further embodiment of a single-tier blockchain with different types of nodes can include nodes that record a hash of the transaction document only and nodes that record the hash with a small record, including chain of title data 353, to allow the chain of title data to become publically visible. The chain of title data can include a select portion of information that describes the real estate transaction, such as an address of the property, names of the buyer and seller, and a purchase price. However, other types of chain of title data are possible. The chain of title information can be obtained from the purchase agreement, which is a part of the transaction documents. Recording the chain of title data requires less storage than the actual transaction documents themselves, which can also be stored by different nodes on the blockchain or in storage independent of the blockchain.

In still a further embodiment, a combination of two or more types of nodes can be included in the single-tier to provide different pieces of information, which can be accessed by the public to determine chain of title for a particular real estate property, as described U.S. patent application Ser. No. , titled "Single-Tier Blockchain-Based System and Method for Document Transformation and Accountability via Different Node Types," filed Sep. 4, 2019, the disclosure of which is hereby incorporated by reference.

Alternatively, rather than including nodes of different types, the single tier can include nodes of the same type, including nodes that record only hashes, nodes that record hashes and the transaction documents, and nodes that record the hashes and chain of title information.

Records of the transaction, chain of title, and the transaction documents themselves can be access from the blockchain based on a request for the information. The information can be accessed using an address of the property, name of the owner or previous owners, or other types of information associated with the transaction.

Figure 20:
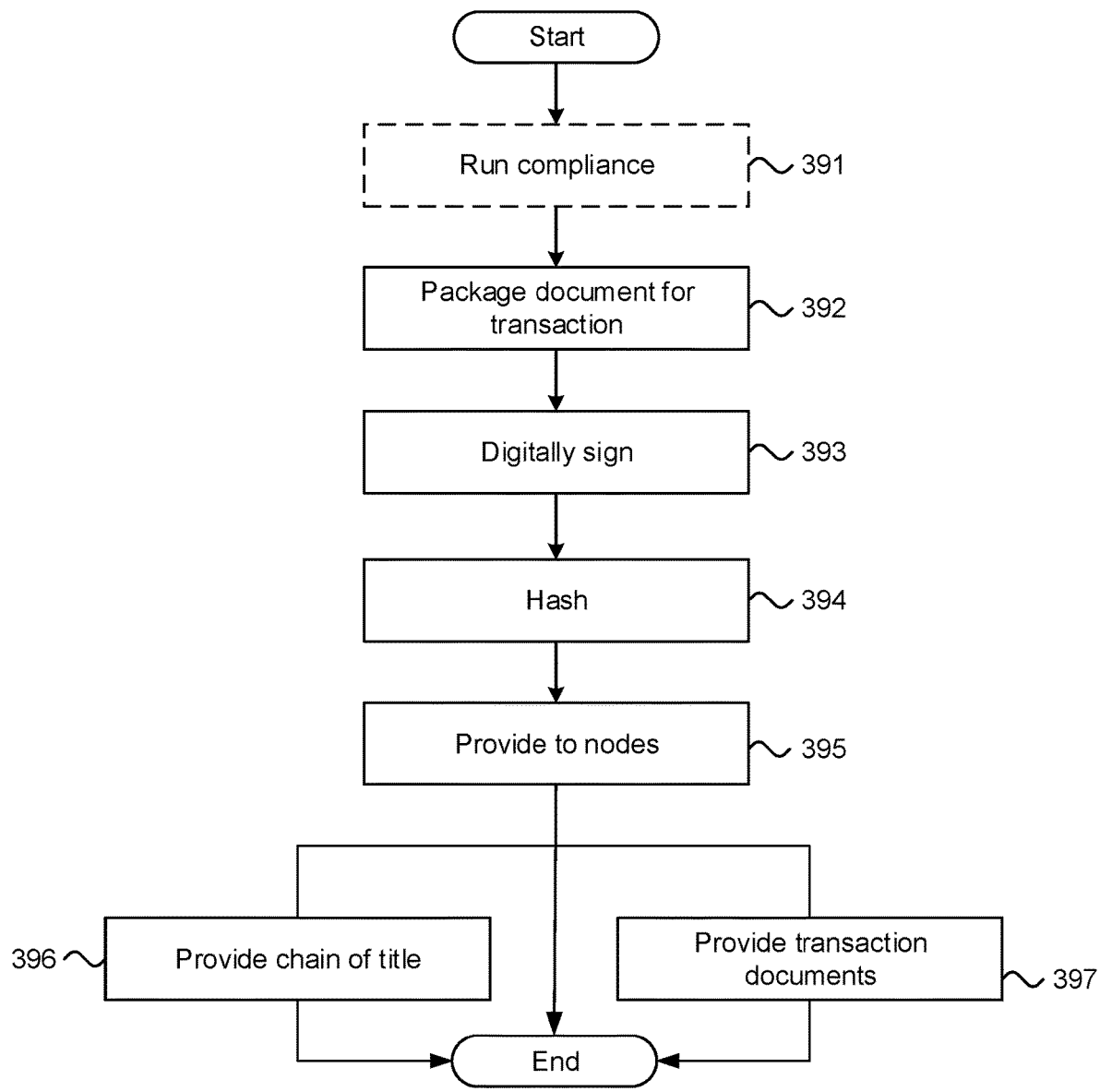
FIG. 20 is a flow diagram showing, by way of example, a different process for document transformation and accountability via a single-tier blockchain.

The cryptographic hash of the transaction documents can be generated by the compliance system or via one or more nodes in the single-tier. FIG. 20 is a flow diagram showing, by way of example, a process 390 for document transformation and accountability via a single-tier blockchain. Transaction documents can optionally be processed (block 391) to ensure compliance, correctness, completeness, and consistency of the documents. Subsequently, one or more of the transaction documents can be grouped (block 392) as a document package for recordation of the transaction and the package can be digitally signed (block 393). Subsequently, a cryptographic hash of the document package can be generated by the compliance system and provided (block 395) to one or more of the nodes in the single-tier. Alternatively, the transaction documents can be provided to the nodes, which can generate the cryptographic hash of the documents. Subsequently, the cryptographic hash is stored on each of the nodes in the single-tier. Additionally, one or more of the nodes can store chain of title data (block 396) and/or transaction documents (block 397) with the cryptographic hash on that node.

Figure 21:
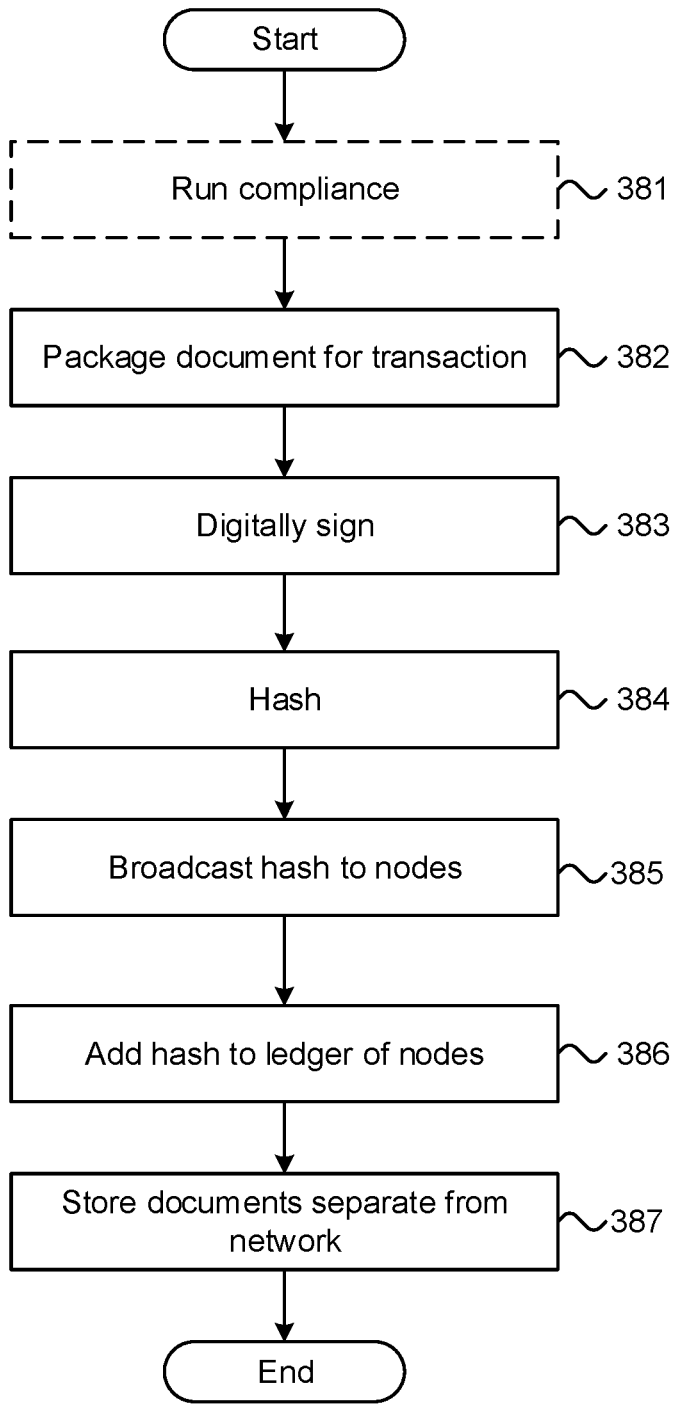
FIG. 21 is a flow diagram showing, by way of example, a process for document transformation and accountability via a single-tier blockchain.

However, when the tier of nodes includes nodes that record only the cryptographic hash or the cryptographic hash and the chain of title data, but not nodes with large enough storage to record the transaction documents, separate storage must be provided. FIG. 21 is a flow diagram showing, by way of example, a process 380 for document transformation and accountability via a single-tier blockchain. A set of transaction documents is generated and a compliance check can be optionally performed (block 381) to ensure that the generated documents are consistent, complete, correct, and compliant with governmental requirements. Next, the transaction documents are gathered (block 382) and digitally signed (block 383).

The transaction documents are cryptographically hashed (block 384) and broadcast (block 385) to one or more nodes in the single-tier. Each node adds (block 386) the cryptographic hash to a copy of a ledger of transactions maintained by that block.

The digitally signed document package is then stored (block 387) separate from the network, such as on a centralized server or in a traditional database independent of the blockchain, and a check sum can be performed to ensure that no tampering is present. For example, a checksum can be added to the document package to ensure that the document package upon access is the same as the document package that was stored.

While the invention has been particularly shown and described as referenced to the embodiments thereof, those skilled in the art will understand that the foregoing and other changes in form and detail may be made therein without departing from the spirit and scope of the invention.

What is claimed is:

1. A single-tier blockchain-based system for document transformation and accountability, comprising:
   a database to maintain transaction documents comprising document templates relating to a transfer of real property, each template comprising form elements, wherein at least a plurality of the form elements are each associated with a data field identifier comprising a string of numbers or letters that uniquely identify that form element and a data value and to maintain a data model for the transaction documents comprising the data field identifiers and the data values for the plurality of form elements; and
   a server comprising a central processing unit, memory, an input port to receive the documents and an output port, wherein the central processing unit is configured to:
   receive a request for the transaction documents;
   automatically populate the form elements of the transaction documents with the data values via the data model in response to the request based on the data field identifier comprising the string of numbers or letters associated with each of the form elements automatically populated, wherein each form element with the same data field identifier is populated with the same data values;
   perform compliance checking on the data values populating the form elements;
   identify one or more network nodes to store a copy of the transaction documents based on a location or value of the real property; and
   commit a cryptographic hash of the transaction documents to a blockchain copy stored by the one or more network nodes in a single-tier when no errors are identified in the data values during the compliance checking.

2. A system according to claim 1, wherein the transaction documents comprise one or more of an executed contract, a chain of title, deed, and escrow funding.

3. A system according to claim 1, wherein the compliance checking comprises running completeness logic on the transaction documents and the form elements of the transaction documents, comprising at least one of:
   comparing the transaction documents for the transaction with a library of document templates for the transaction and determining one of a new transaction document template is required for the transaction and no further transaction documents are required for the transaction;
   identifying one or more form elements without data values associated and creating a status indicator for the one or more identified form elements; and
   adding one or more form elements to one of the transaction documents based on a related form element.

4. A system according to claim 1, wherein the compliance checking comprises running consistency logic on the form elements of the transaction documents, comprising:
- identifying a change to one of the data values within one of the form elements of one such transaction document; and
- propagating the changed data value to each transaction document with at least one form element with the same data field identifier.

5. A system according to claim 1, wherein the compliance checking comprises running correctness logic on the form elements of the transaction documents, comprising:
- reviewing the data field values and combinations of the data field values within the transaction documents; and
- determining whether the data field values and the combinations of data field values are verified by at least one authoritative source.

6. A system according to claim 1, wherein the compliance checking comprises running compliance logic on the transaction documents, comprising:
- identifying a required set of documents for the transaction based on an address for the real property to be transferred; and
- confirming that the transaction documents include all the documents in the required set of documents for the transaction.

7. A system according to claim 1, wherein the compliance checking comprises running confirmation logic on the form elements of the transaction documents, comprising:
- reviewing the transaction documents;
- identifying fields designated for signatures and dates; and
- determining whether the identified fields designated for signatures and dates are associated with populated data values.

8. A system according to claim 1, wherein the network nodes perform the same functions comprising one of recording only the cryptographic hash, recording the cryptographic hash and the transaction documents, and recording the cryptographic hash and chain of title information for the transfer of real property.

9. A system according to claim 1, wherein the cryptographic hash of the transaction documents is generated and provided to the network nodes in the single-tier or is generated by the network nodes.

10. A system according to claim 1, wherein the transaction documents are stored in a database or centralized server remote from the network nodes when the network nodes are not large enough to store the transaction documents.

11. A single-tier blockchain-based method for document transformation and accountability, comprising:
- maintaining transaction documents comprising document templates relating to a transfer of real property, each template comprising form elements, wherein at least a plurality of the form elements are each associated with a data field identifier comprising a string of numbers or letters that uniquely identify that form element and a data value;
- maintaining a data model for the transaction documents comprising the data field identifiers and the data values for the plurality of form elements;
- receiving a request for the transaction documents;
- automatically populating the form elements of the transaction documents with the data values via the data model in response to the request based on the data field identifier comprising the string of numbers or letters associated with each of the form elements automatically populated, wherein each form element with the same data field identifier is populated with the same data values;
- performing compliance checking on the data values populating the form elements;
- identifying one or more network nodes to store a copy of the transaction documents based on a location or value of the real property; and
- committing a cryptographic hash of the transaction documents to a blockchain copy stored by the one or more network nodes in a single-tier when no errors are identified in the data values during the compliance checking.

12. A method according to claim 11, wherein the transaction documents comprise one or more of an executed contract, a chain of title, deed, and escrow funding.

13. A method according to claim 11, wherein the compliance checking comprises running completeness logic on the transaction documents and the form elements of the transaction documents, comprising at least one of:
- comparing the transaction documents for the transaction with a library of document templates for the transaction and determining one of a new transaction document template is required for the transaction and no further transaction documents are required for the transaction;
- identifying one or more form elements without data values associated and creating a status indicator for the one or more identified form elements; and
- adding one or more form elements to one of the transaction documents based on a related form element.

14. A method according to claim 11, wherein the compliance checking comprises running consistency logic on the form elements of the transaction documents, comprising:
- identifying a change to one of the data values within one of the form elements of one such transaction document; and
- propagating the changed data value to each transaction document with at least one form element with the same data field identifier.

15. A method according to claim 11, wherein the compliance checking comprises running correctness logic on the form elements of the transaction documents, comprising:
- reviewing the data field values and combinations of the data field values within the transaction documents; and
- determining whether the data field values and the combinations of data field values are verified by at least one authoritative source.

16. A method according to claim 11, wherein the compliance checking comprises running compliance logic on the transaction documents, comprising:
- identifying a required set of documents for the transaction based on an address for the real property to be transferred; and
- confirming that the transaction documents include all the documents in the required set of documents for the transaction.

17. A method according to claim 11, wherein the compliance checking comprises running confirmation logic on the form elements of the transaction documents, comprising:
- reviewing the transaction documents;
- identifying fields designated for signatures and dates; and
- determining whether the identified fields designated for signatures and dates are associated with populated data values.

18. A method according to claim 11, wherein the network nodes perform the same functions comprising one of recording only the cryptographic hash, recording the cryptographic hash and the transaction documents, and recording the cryptographic hash and chain of title information for the transfer of real property.

19. A method according to claim 11, wherein the cryptographic hash of the transaction documents is generated and provided to the network nodes in the single-tier or is generated by the network nodes.

20. A method according to claim 11, further comprising:
  storing the transaction documents in a database or centralized server remote from the network nodes when the network nodes are not large enough to store the transaction documents.

\* \* \* \* \*